US009507711B1

(12) United States Patent
Kotte et al.

(10) Patent No.: US 9,507,711 B1
(45) Date of Patent: Nov. 29, 2016

(54) HIERARCHICAL FTL MAPPING OPTIMIZED FOR WORKLOAD

(71) Applicant: SanDisk Enterprise IP LLC, Milpitas, CA (US)

(72) Inventors: Dharani Kotte, Fremont, CA (US); Akshay Mathur, San Jose, CA (US); Satish B. Vasudeva, Fremont, CA (US); Sumant K. Patro, Fremont, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 21 days.

(21) Appl. No.: 14/720,470

(22) Filed: May 22, 2015

(51) Int. Cl.
G06F 12/10 (2016.01)
G06F 12/02 (2006.01)
G06F 12/06 (2006.01)

(52) U.S. Cl.
CPC ....... *G06F 12/0246* (2013.01); *G06F 12/0638* (2013.01); *G06F 2212/205* (2013.01); *G06F 2212/7201* (2013.01)

(58) Field of Classification Search
CPC .......... G06F 12/0246; G06F 12/0638; G06F 2212/7201; G06F 2212/205
See application file for complete search history.

(56) References Cited

U.S. PATENT DOCUMENTS

| 2011/0099325 A1* | 4/2011 | Roh | G06F 3/0619 711/103 |
|---|---|---|---|
| 2012/0110249 A1* | 5/2012 | Jeong | G06F 3/0616 711/103 |
| 2013/0046920 A1* | 2/2013 | Ryu | G06F 12/0246 711/103 |
| 2014/0208004 A1* | 7/2014 | Cohen | G06F 12/0246 711/103 |
| 2014/0379959 A1* | 12/2014 | Canepa | G06F 12/0246 711/103 |
| 2015/0138884 A1* | 5/2015 | Park | G06F 13/385 365/185.08 |

OTHER PUBLICATIONS

Wei et al.; WAFTL: A Worload Adaptive Flash Translation Layer with Data Partition, Data Storage Institute, A-STAR, Singapore, National University of Singapore, May 26, 2011, 12 pgs.
Gupta et al.; DFTL: A Flash Translation Layer Employing Demand-based Selecteive Caching of Page-Level Address Mappings, ACM, New York, NY, USA 2009, 12 pgs.

* cited by examiner

*Primary Examiner* — Hiep Nguyen
(74) *Attorney, Agent, or Firm* — Morgan, Lewis & Bockius LLP

(57) ABSTRACT

In a memory system having non-volatile memory and volatile memory, write data are stored in a write-coalescing buffer in the volatile memory until the write data is written to non-volatile memory. First and second level address mapping tables are stored in the volatile memory and corresponding first and second level address mapping tables are stored in the non-volatile memory, and furthermore the second level address mapping table in the volatile memory contains entries corresponding to only a subset of the entries in the second level address mapping table in the non-volatile memory. The first address-mapping table in volatile memory includes entries storing pointers to entries in the second address-mapping table in volatile memory, entries storing pointers to locations in the write-coalescing buffer, and entries storing pointers to locations in the non-volatile memory that store data.

23 Claims, 12 Drawing Sheets

HIERARCHICAL FTL MAPPING OPTIMIZED FOR WORKLOAD

TECHNICAL FIELD

The disclosed embodiments relate generally to memory systems, and in particular, to logical to physical mapping in the flash translation layer (FTL) of a storage device (e.g., comprising one or more flash memory devices).

BACKGROUND

Flash memory devices are non-volatile data storage devices that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information. Flash memories come in different capacities and electronic architectures. For example, depending on the manufacture, model, and technology used, memory banks in a flash memory device are arranged in blocks with sizes including but not limited to 16 KB, 128 KB, 256 KB, or 512 KB. Each block is further organized into pages. The number of pages can be 32, 64, 128, or more with each page having a possible size (but not limited to) of 256 B, 512 B, 1 KB, 2 KB, 4 KB, or 8 KB.

The data storage operations of flash memories typically comprise three basic operations: page read, page program (or equivalent to write), and block erase. Before a page can be programmed or re-programmed, a block erase of the block containing the page is performed first. Because of these data storage operation characteristics, a string of data is stored in physical memory locations in a flash memory device that do not correspond to the logical order of the data bits in the string of data. In order to locate the physical memory locations, software and hardware architectures of a flash memory device typically include a flash translation layer (FTL) that is responsible for translating logical addresses of data to and from physical memory addresses at which data are or will be stored in the flash memory device.

As capacity of flash memory devices increases, the dynamic random access memory (DRAM) required for storing the FTL mapping tables also increases, at corresponding increased cost. Furthermore, in typical usage, large portions of FTL mapping tables are mainly dormant for long periods of time.

SUMMARY

Various embodiments of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various embodiments are used to perform efficient address mapping in a non-volatile storage device. In one aspect, in a memory system having non-volatile memory and volatile memory, write data are stored in a write-coalescing buffer in the volatile memory until the write data is written to non-volatile memory. Furthermore, first and second level address mapping tables are stored in the volatile memory and corresponding first and second level address mapping tables are stored in the non-volatile memory, and furthermore the second level address mapping table in the volatile memory contains entries corresponding to only a subset of the entries in the second level address mapping table in the non-volatile memory. The first address-mapping table in volatile memory includes entries storing pointers to entries in the second address-mapping table in volatile memory, entries storing pointers to locations in the write-coalescing buffer, and entries storing pointers to locations in the non-volatile memory that store data.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1:
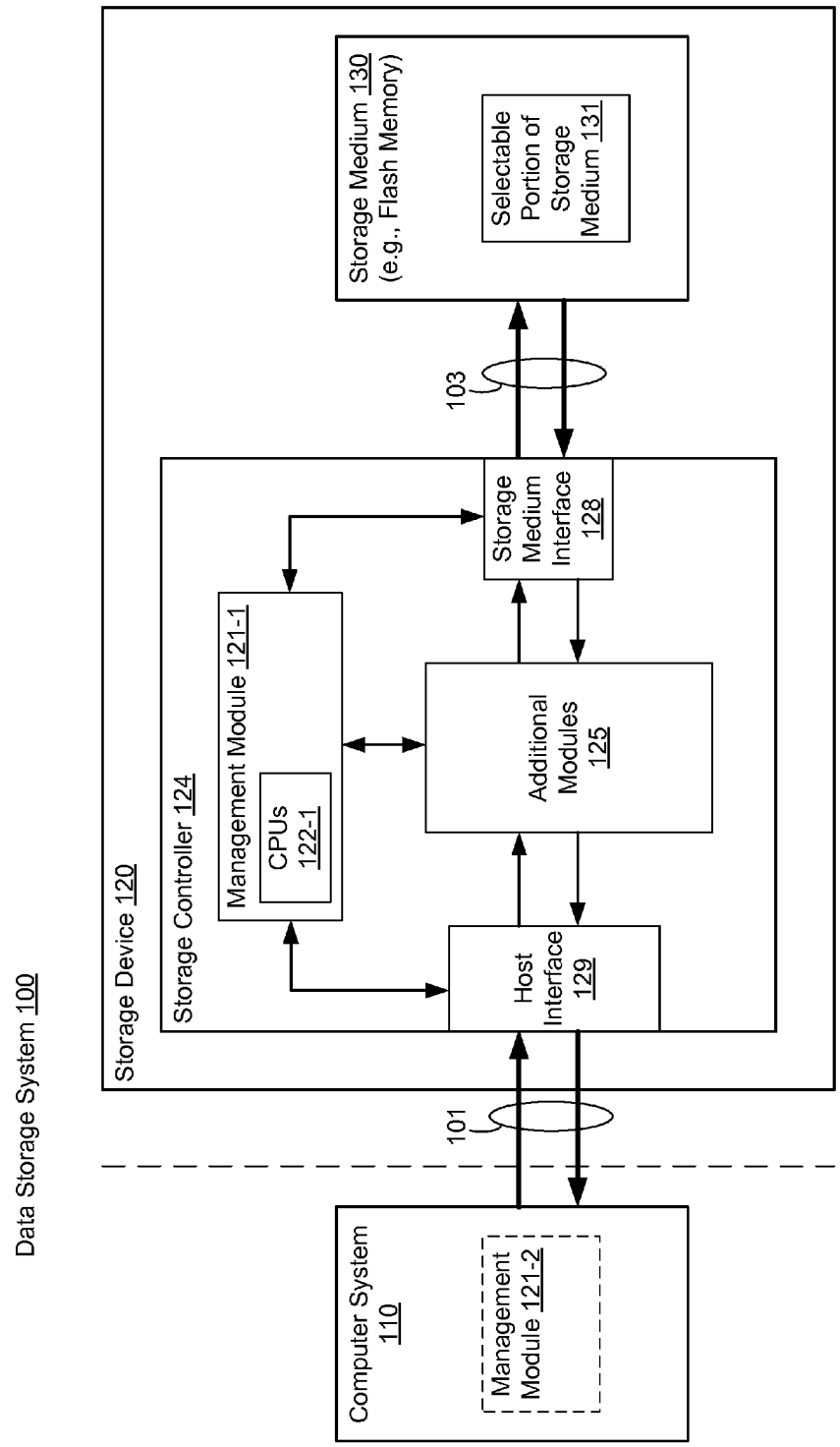
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

In embodiments described herein, address mapping structures are provided that map logical addresses to physical addresses at two levels of granularity, and furthermore provide methods of updating the address mapping structures that are responsive to different usage patterns, in particular random writes on the one hand and sequential writes on the other. Furthermore, regions of an address space having differing amounts of sequential reads are treated differently so as to optimize what address mapping information is retained in volatile memory.

(A1) More specifically, some embodiments include a method of performing address mapping. In some embodiments, the method includes, in a memory system comprising non-volatile memory and volatile memory: (1) storing write data in a write-coalescing buffer in the volatile memory; (2) in accordance with satisfaction of a condition, moving the write data from the write-coalescing buffer to the non-volatile memory and freeing space in the write-coalescing buffer; and (3) maintaining a first address-mapping table and a second address-mapping table in the volatile memory, wherein (i) the first address-mapping table includes entries storing pointers to entries in the second address-mapping table, entries storing pointers to locations in the write-coalescing buffer, and entries storing pointers to locations in the non-volatile memory that store data; and (ii) the second address-mapping table includes entries storing pointers to locations in the write-coalescing buffer and entries storing pointers to locations in the non-volatile memory that store data. The method optionally further includes: (4) receiving read commands to perform read operations, the read commands specifying respective logical addresses; (5) based on the logical addresses, accessing respective entries in the first address-mapping table; (6) translating the logical addresses to respective physical addresses in the memory system, using pointers in the respective entries in the first address-mapping table, and for a subset of the read commands, corresponding pointers in the second address-mapping table; and (7) performing the read operations at the respective addresses.

(A2) In some embodiments of the method of A1, the method further includes: maintaining a third address-mapping table in the non-volatile memory, wherein (i) entries in the third address-mapping table store pointers to locations in the non-volatile memory that store data; and (ii) the first address-mapping table further includes entries storing pointers to entries in the third address-mapping table.

(A3) In some embodiments of the method of A1, the non-volatile memory stores a plurality of macro pages; each macro page in the plurality of macro pages includes a plurality of virtual pages; and the number of entries in the first address mapping table corresponds to the number of macro pages in a predefined logical address space associated with a host system.

(A4) In some embodiments of the method of A3, accessing respective entries in the first address-mapping table based on the logical addresses includes: (1) dividing the logical addresses by a divisor corresponding to a size of the macro pages to generate respective indices for the first address-mapping table; and (2) reading respective entries of the first address-mapping table as indexed by the respective indices.

(A5) In some embodiments of the method of A3, the pointer in each entry in the first address-mapping table that stores a pointer to a location in the write-coalescing buffer includes a pointer to a location in the write-coalescing buffer for storing a macro page of data; and the pointer in each entry in the first address-mapping table that stores a pointer to a location in the non-volatile memory that stores data includes a pointer to a location in the non-volatile memory for storing a macro page of data.

(A6) In some embodiments of the method of A5, the pointer in each entry of the second address-mapping table that stores a pointer to a location in the write-coalescing buffer includes a pointer to a location in the write-coalescing buffer for storing a virtual page of data; and the pointer in each entry in the second address-mapping table that stores a pointer to a location in the non-volatile memory that stores data includes a pointer to a location in the non-volatile memory for storing a virtual page of data.

(A7) In some embodiments of the method of A3, the method further includes: (1) for a first read command specifying a first logical address: (i) reading a pointer to a macro page in the non-volatile memory from an entry corresponding to the first logical address in the first address-mapping table; and (ii) using the pointer to read data from the macro page in the non-volatile memory; and (2) for a second read command specifying a second logical address: (i) reading a pointer to a macro page in the write-coalescing buffer from an entry corresponding to the second logical address in the first address-mapping table; and (ii) reading data from the macro page in the write-coalescing buffer.

(A8) In some embodiments of the method of A7, the method further includes, for a third read command specifying a third logical address: (1) determining that an entry corresponding to the third logical address in the first address-mapping table does not store a valid pointer; and (2) based on the determining, returning a predefined null response to the third read command.

(A9) In some embodiments of the method of A7, the method further includes: (1) for a fourth read command specifying a fourth logical address: (i) reading a pointer, identifying a first group of entries in the second address-mapping table, from an entry corresponding to the fourth logical address in the first address-mapping table; (ii) reading a pointer, to a virtual page in the non-volatile memory, from an entry in the first group of entries in the second address-mapping table that is indexed by a portion of the fourth logical address; and (iii) reading data from the virtual page in the non-volatile memory; and (2) for a fifth read command specifying a fifth logical address: (i) reading a pointer, identifying a second group of entries in the second address-mapping table, from an entry corresponding to the fifth logical address in the first address-mapping table; (ii) reading a pointer, to a virtual page in the write-coalescing buffer, from an entry in the second group of entries in the second address-mapping table that is indexed by a portion of the fifth logical address; and (iii) reading data from the virtual page in the write-coalescing buffer.

(A10) In some embodiments of the method of A3, the method further includes: (1) receiving a first write command and write data associated with the first write command, wherein the first write command specifies a first logical address and the write data has a size equal to or greater than a macro page; and (2) responding to the first write command by: (i) writing the data associated with the first write command to the write-coalescing buffer; and (ii) storing, in an entry corresponding to the first logical address in the first address-mapping table, a pointer to a location in the write-coalescing buffer to which the data associated with the first write command was written.

(A11) In some embodiments of the method of A10, responding to the first write command includes allocating an available portion of the write-coalescing buffer with a size equal to the size of a macro page, and writing the write data associated with the first write command to the allocated portion of the write-coalescing buffer.

(A12) In some embodiments of the method of A3, the method further includes: maintaining a third address-mapping table and a fourth address-mapping table in the non-volatile memory, wherein: (i) a plurality of entries in the third address-mapping table store pointers to respective macro pages in the non-volatile memory; and (ii) a plurality of entries in the fourth address-mapping table store pointers to respective virtual pages in the non-volatile memory.

(A13) In some embodiments of the method of A12, the method further includes: (1) maintaining in the volatile memory a fifth table that stores pointers to locations in the non-volatile memory that store groups of entries in the fourth address-mapping table; (2) updating the fifth table when flushing data from the write-coalescing buffer to the non-volatile memory; and (3) accessing a pointer in the fifth table in accordance with a determination to copy a portion of the fourth address-mapping table to the second address-mapping table.

(A14) In some embodiments of the method of any of A1-A13, the method further includes: (1) maintaining in the volatile memory a change log that stores values corresponding to logical addresses and changes in locations in the non-volatile memory corresponding to the logical addresses; and (2) storing information in the change log in the non-volatile memory in response to system shutdown, power failure, or an amount of information stored in the change log satisfying a threshold.

(A15) In some embodiments of the method of any of A12-A14, the method further includes, for a respective read command specifying a respective logical address: (1) reading, from an entry corresponding to the respective logical address in the first address-mapping table, a pointer to an entry in the fourth address-mapping table; (2) reading, from the entry in the fourth address-mapping table, a pointer to a virtual page in the non-volatile memory; and (3) reading data from the virtual page in the non-volatile memory.

(A16) In some embodiments of the method of any of A12-A15, the second address-mapping table corresponds to a subset of the fourth address-mapping table and is divided into regions, each region having a set of entries, the method further includes: (1) for each set of region of the second address-mapping table, maintaining a count of sequential read operations from logical addresses corresponding to the region of the second address-mapping table, using sequential read counters; (2) detecting a trigger condition; and (3) in response to detecting the trigger condition: (i) selecting a region of the second address-mapping table having the highest count of sequential read operations, (ii) updating entries in the fourth address-mapping table with information from the selected region of the second address-mapping table, and (iii) erasing the selected region of the second address-mapping table.

(A17) In some embodiments of the method of A16, the method includes, after erasing the selected region of the second address-mapping table, copying into the selected region of the second address-mapping table information from entries in the fourth address-mapping table that are indexed by a portion of a logical address associated with the trigger condition.

(A18) In some embodiments of the method of any of A1 to A17, the non-volatile memory comprises NAND flash memory and the volatile memory comprises double-date-rate dynamic random access memory (DRAM).

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure pertinent aspects of the embodiments described herein.

FIG. 1 is a block diagram illustrating data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes a storage device 120, which includes a storage controller 124 and a storage medium 130, and is used in conjunction with or includes a computer system 110. In some embodiments, storage medium 130 is a single flash memory device while in other embodiments storage medium 130 includes a plurality of flash memory devices. In some embodiments, storage medium 130 is NAND-type flash memory or NOR-type flash memory. In some embodiments, storage medium 130 includes one or more three-dimensional (3D) memory devices, as further defined herein. Further, in some embodiments storage controller 124 is a solid-state drive (SSD) controller. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, data storage system 100 can contain one or more storage device 120s.

Computer system 110 is coupled to storage controller 124 through data connections 101. However, in some embodiments computer system 110 includes storage controller 124, or a portion of storage controller 124, as a component and/or a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch screen display, a mouse, a track-pad, a digital camera and/or any number of supplemental devices to add functionality. In some embodiments, computer system 110 does not have a display and other user interface components.

Storage medium 130 is coupled to storage controller 124 through connections 103. Connections 103 are sometimes called data connections, but typically convey commands in addition to data, and optionally convey metadata, error correction information and/or other information in addition to data values to be stored in storage medium 130 and data values read from storage medium 130. In some embodiments, however, storage controller 124 and storage medium 130 are included in the same device (i.e., an integral device) as components thereof. Furthermore, in some embodiments, storage controller 124 and storage medium 130 are embedded in a host device (e.g., computer system 110), such as a mobile device, tablet, other computer or computer controlled device, and the methods described herein are performed, at least in part, by the embedded memory controller. Storage medium 130 may include any number (i.e., one or more) of memory devices including, without limitation, non-volatile semiconductor memory devices, such as flash memory device(s). For example, flash memory device(s) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) can also be configured for relatively smaller-scale applications such as personal flash drives or hard-disk replacements for personal, laptop, and tablet computers. In some embodiments, storage medium 130 includes one or more three-dimensional (3D) memory devices, as further defined herein.

Storage medium 130 is divided into a number of addressable and individually selectable blocks, such as selectable portion 131. In some embodiments, the individually selectable blocks are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

In some embodiments, storage controller 124 includes a management module 121-1, a host interface 129, a storage medium I/O interface 128, and additional module(s) 125. Storage controller 124 may include various additional features that have not been illustrated for the sake of brevity and so as not to obscure pertinent features of the example embodiments disclosed herein, and a different arrangement of features may be possible. Host interface 129 provides an interface to computer system 110 through data connections 101. Similarly, storage medium I/O 128 provides an interface to storage medium 130 though connections 103. In some embodiments, storage medium I/O 128 includes read and write circuitry, including circuitry capable of providing reading signals to storage medium 130 (e.g., reading threshold voltages for NAND-type flash memory).

In some embodiments, management module 121-1 includes one or more processing units (CPUs, also sometimes called processors) 122-1 configured to execute instructions in one or more programs (e.g., in management module 121-1). In some embodiments, the one or more CPUs 122-1 are shared by one or more components within, and in some cases, beyond the function of storage controller 124. Management module 121-1 is coupled to host interface 129, additional module(s) 125 and storage medium I/O 128 in order to coordinate the operation of these components. In some embodiments, one or more modules of management module 121-1 are implemented in management module 121-2 of computer system 110. In some embodiments, one or more processors of computer system 110 (not shown) are configured to execute instructions in one or more programs (e.g., in management module 121-2). Management module 121-2 is coupled to storage device 120 in order to manage the operation of storage device 120.

Additional module(s) 125 are coupled to storage medium I/O 128, host interface 129, and management module 121-1. As an example, additional module(s) 125 may include an error control module to limit the number of uncorrectable errors inadvertently introduced into data during writes to memory or reads from memory. In some embodiments, additional module(s) 125 are executed in software by the one or more CPUs 122-1 of management module 121-1, and, in other embodiments, additional module(s) 125 are implemented in whole or in part using special purpose circuitry (e.g., to perform encoding and decoding functions). In some embodiments, additional module(s) 125 are implemented in whole or in part by software executed on computer system 110.

In some embodiments, an error control module, included in additional module(s) 125, includes an encoder and a decoder. In some embodiments, the encoder encodes data by applying an error control code to produce a codeword, which is subsequently stored in storage medium 130. When the encoded data (e.g., one or more codewords) is read from storage medium 130, the decoder applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

In some embodiments, during a write operation, host interface 129 receives data to be stored in storage medium 130 from computer system 110 (sometimes called a host, host system, client, or client system). The data received by host interface 129 is made available to an encoder (e.g., in additional module(s) 125), which encodes the data to produce one or more codewords. The one or more codewords are made available to storage medium I/O 128, which transfers the one or more codewords to storage medium 130 in a manner dependent on the type of storage medium being utilized. In some embodiments, as described in greater detail below with respect to FIGS. 2-5, management module 121-1 in storage controller 124 maps a logical address from computer system 110 to a physical address, which determines or identifies memory locations (addresses) of storage medium 130 to which to write the data.

In some embodiments, a read operation is initiated when computer system (host) 110 sends one or more host read commands (e.g., via data connections 101, or alternatively a separate control line or bus) to storage controller 124 requesting data from storage medium 130. Storage controller 124 sends one or more read access commands to storage medium 130, via storage medium I/O 128, to obtain raw read data in accordance with memory locations (addresses) specified by the one or more host read commands. In some embodiments, as described in greater detail below with respect to FIGS. 2-5, management module 121-1 in storage controller 124 maps a logical address from computer system 110 to a physical address, which determines or identifies memory locations (addresses) of storage medium 130 from which to read the requested data. After retrieving the requested data from the memory locations by management module 121-1, storage medium I/O 128 provides the raw read data (e.g., comprising one or more codewords) to a decoder (e.g., in additional module(s) 125). If the decoding is successful, the decoded data is provided to host interface 129, where the decoded data is made available to computer system 110. In some embodiments, if the decoding is not successful, storage controller 124 may resort to a number of remedial actions or provide an indication of an irresolvable error condition.

As explained above, a storage medium (e.g., storage medium 130) is divided into a number of addressable and individually selectable blocks and each block is optionally (but typically) further divided into a plurality of pages and/or word lines and/or sectors. While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called fast page), and (2) an upper page (sometimes called slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell.

The encoding format of the storage media (i.e., TLC, MLC, or SLC and/or a chose data redundancy mechanism) is a choice made when data is actually written to the storage media. Often in this specification there is described an event, condition, or process that is said to set the encoding format, alter the encoding format of the storage media, etc. It should be recognized that the actual process may involve multiple steps, e.g., erasure of the previous contents of the storage media followed by the data being written using the new encoding format and that these operations may be separated in time from the initiating event, condition or procedure.

As an example, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written. Since flash memory can only be programmed and erased a limited number of times, the efficiency of the algorithm used to pick the next block(s) to re-write and erase has a significant impact on the lifetime and reliability of flash-based storage systems.

Write amplification is a phenomenon where the actual amount of physical data written to a storage medium (e.g., storage medium 130 in storage device 120) is a multiple of the logical amount of data written by a host (e.g., computer system 110, sometimes called a host) to the storage medium. As discussed above, when a block of storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by equation:

$$\frac{\text{amount of data written to a storage medium}}{\text{amount of data written by a host}}$$

One of the goals of any flash memory based data storage system architecture is to reduce write amplification as much as possible so that available endurance is used to meet storage medium reliability and warranty specifications. Higher system endurance also results in lower cost as the storage system may need less over-provisioning. By reducing write amplification, the endurance of the storage medium is increased and the overall cost of the storage system is decreased. Generally, garbage collection is performed on erase blocks with the fewest number of valid pages for best performance and best write amplification.

As noted above, systems, methods, and/or devices in accordance with various embodiments described herein provide various benefits, such as decoupling DRAM size constraint from storage device capacity, making a tradeoff between DRAM size and performance, optimizing mapping data structures to adapt to different workloads, and generating uniform random read performance that is proportional to DRAM size. The benefits provided by the various embodiments described herein are better understood with reference to the below descriptions of FIGS. 2-5.

Figure 2:
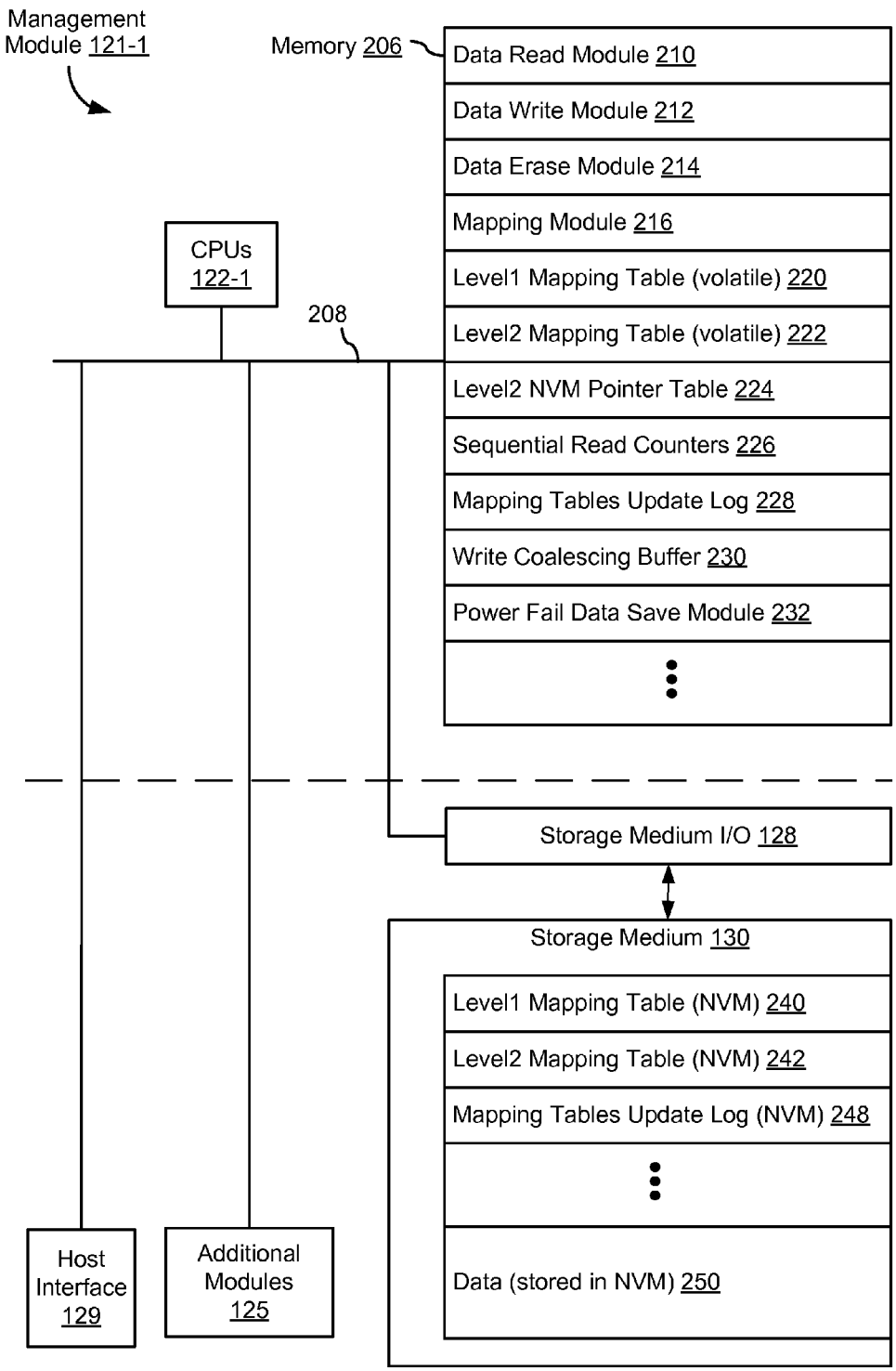
FIG. 2 is a block diagram illustrating an implementation of a management module, in accordance with some embodiments.

FIG. 2 is a block diagram illustrating a management module 121-1 of computer system 110 (FIG. 1), in accordance with some embodiments. Management module 121-1 typically includes one or more processing units (sometimes called CPUs or processors) 122-1 for executing modules, programs and/or instructions stored in memory 206-1 and thereby performing processing operations, memory 206 (sometimes called controller memory), and one or more communication buses 208 for interconnecting these components. The one or more communication buses 208 optionally include circuitry (sometimes called a chipset) that interconnects and controls communications between system components. Management module 121-1 is coupled to host interface 129, additional module(s) 125, and storage medium I/O 128 by the one or more communication buses 208. Through storage medium I/O 128, read and write signals are provided to storage medium 130.

As explained above, a storage medium (e.g., storage medium 130) is divided into a number of addressable and individually selectable blocks and each block is optionally (but typically) further divided into a plurality of pages and/or word lines and/or sectors for storing data 250. In some embodiments, a virtual page corresponds to a smallest addressable unit of non-volatile memory (e.g., 4 KB). In some embodiments, a plurality of virtual pages correspond to a macro page. The macro page size is thus equal to an integer multiple of the virtual page size (e.g., a macro page of size 64 KB is equal to 16 virtual pages of size 4 KB).

In addition to storing data 250, in some embodiments, storage medium 130 stores the following data structures or a subset or superset thereof:

level 1 (L1) mapping table (non-volatile) 240 that is used for storing pointers to respective macro pages in a non-volatile storage medium (e.g., storage medium 130, FIG. 1);

level 2 (L2) mapping table (non-volatile) 242 that is used for storing pointers to respective virtual pages in a non-volatile storage medium (e.g., storage medium 130, FIG. 1); and mapping tables update log (non-volatile) 248 that is used for storing a transaction log of changes to the mapping tables, which, if needed, can be used to restore the mapping tables after a system shutdown or power failure.

Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from the CPU(s) 122-1. Memory 206, or alternatively the non-volatile memory device(s) within memory 206, comprises a non-transitory computer readable storage medium. In some embodiments, memory 206, or the non-transitory computer readable storage medium of memory 206 stores the following programs, modules, and data structures, or a subset or superset thereof:

- data read module 210 that is used for reading data from one or more codewords, pages or blocks in a storage medium (e.g., storage medium 130, FIG. 1);
- data write module 212 that is used for writing data to one or more codewords, pages or blocks in a storage medium (e.g., storage medium 130, FIG. 1);
- data erase module 214 that is used for erasing data from one or more blocks in a storage medium (e.g., storage medium 130, FIG. 1);
- garbage collection module (not shown in FIG. 2) that is used for garbage collection for one or more blocks in a storage medium (e.g., storage medium 130, FIG. 1);
- mapping module 216 that is used for managing logical to physical address mapping, including mapping logical locations (addresses) to physical locations (addresses) in a storage medium (e.g., storage medium 130, FIG. 1);
- level 1 (L1) mapping table (volatile) 220 that is used, in conjunction with the level 2 (L2) mapping tables 222 and 242, to map logical addresses to physical addresses in a non-volatile storage medium (e.g., storage medium 130, FIG. 1) or in a write-coalescing buffer 230; in some embodiments, each entry of L1 mapping table (volatile) 220 corresponds to a logical address space region having a size equal to the size of a macro page (e.g., 16 virtual pages);
- level 2 (L2) mapping table (volatile) 222 that is used, in conjunction with the level 1 (L1) mapping table 220, to map logical addresses to virtual page physical addresses in a non-volatile storage medium (e.g., storage medium 130, FIG. 1) or in the write-coalescing buffer 230; in some embodiments, each entry of L2 mapping table (volatile) 222 corresponds to a logical address space region having a size equal to the size of a virtual page (e.g., one flash memory page);
- level 2 (L2) non-volatile memory pointer table 224 that is used for storing pointers to locations in the non-volatile memory 130 that store groups of entries in L2 mapping table (non-volatile) 242;
- sequential read counters 226 that are used for storing counts of sequentially reads within corresponding logical address regions of a logical address space (e.g., a logical address space of a host system); sequential read counters 226 are used to identify, if needed, which entries in entries in write-coalescing buffer 230 to evict to non-volatile storage (e.g., storage medium 130, FIG. 1);
- mapping tables update log 228 that is used for storing a transaction log (or recently written portions of the transaction log) of changes to the mapping tables, which, if needed, can be used to restore the mapping tables after a system shutdown or power failure;
- write-coalescing buffer 230 that is used for temporarily storing write data prior to the write data being flushed to non-volatile memory (e.g., storage medium 130); in response to a host read command, if data for a respective logical address (e.g., a LBA) is stored in write-coalescing buffer 230, then the data are retrieved from the buffer; and
- power fail data save module 232 that is used to save data stored in management module 121-1 to a non-volatile storage medium (e.g., storage medium 130, FIG. 1) in case of a power failure or system shutdown.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing some of the methods described below. In some embodiments, some or all of these modules may be implemented with specialized hardware circuits that subsume part or all of the module functionality.

Although FIG. 2 shows management module 121-1 in accordance with some embodiments, FIG. 2 is intended more as a functional description of the various features which may be present in management module 121-1 than as a structural schematic of the embodiments described herein. In practice, and as recognized by those of ordinary skill in the art, the programs, modules, and data structures shown separately could be combined and some programs, modules, and data structures could be separated.

Using management module 121-1, host commands are executed. For example, during a write operation, host interface 129 (FIG. 1) receives data to be stored in non-volatile memory 130 (FIG. 1) from computer system 110 (FIG. 1). The data received by host interface 129 are made available to management module 121-1. To improve command processing and execution time, the data received are stored in write-coalescing buffer (WCB) 230 in volatile memory (e.g., volatile memory 301, FIG. 3). In accordance with satisfaction of a trigger condition (e.g., a condition requiring room in the write-coalescing buffer to store other data), management module 121-1 moves at least some of the data stored in WCB 230 to non-volatile memory 130 and frees space in WCB 230. Entries in the various mapping tables are updated to reflect new locations of data flushed from WCB 230 to non-volatile memory 130, and optionally the updated mapping table entries are also flushed to non-volatile memory 130.

In another example, during a read operation, computer system (host) 110 (FIG. 1) sends one or more host read commands to storage controller 124 (FIG. 1) requesting data from storage medium 130. The host read commands specify respective logical addresses. In response to the host read commands, based on the logical addresses specified by the host read commands, management module 121-1 accesses respective entries in L1 mapping table 220. Using the information stored in various mapping tables, including in L1 mapping table 220, management module 121-1 translates the respective logical addresses to respective physical addresses in the memory system and performs the read operations at the respective addresses. This process is further explained below.

Figure 3:
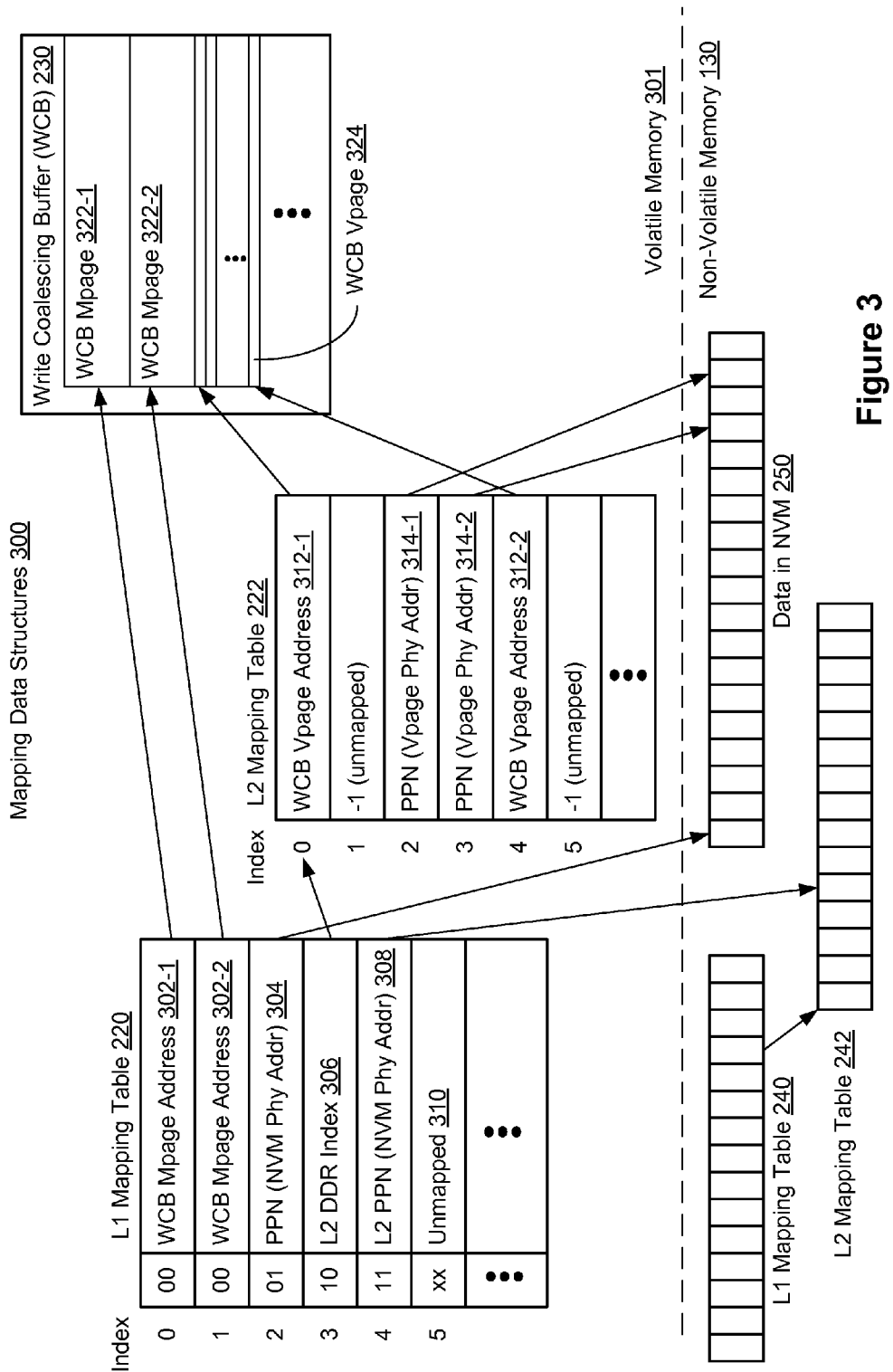
FIG. 3 is a block diagram of mapping data structures for logical to physical address mapping, in accordance with some embodiments.

FIG. 3 is a block diagram of mapping data structures 300, in accordance with some embodiments. In some embodiments, mapping data structures 300, as part of the FTL for a storage device (e.g., storage device 120, FIG. 1), are used to translate a logical block address (LBA) from the perspective of a host (e.g., computer system 110, FIG. 1) to a physical address in a physical address space of non-volatile memory (e.g., non-volatile storage medium 130) in a storage device (e.g., storage device 120, FIG. 1). In order to decrease command processing and execution time for commands received from a host (e.g., computer system 110), a storage device (e.g., storage device 120, FIG. 1), in some embodiments, stores information in various data structures in volatile memory 301 (sometimes called controller memory, or a portion of controller memory). Management module 121-1 (FIG. 2) maintains information stored in volatile memory 301 as well as in non-volatile memory 130.

As explained above, data stored in non-volatile memory 130 are organized into a plurality of macro pages (e.g., 64 KB). Each macro page in non-volatile memory 130 is further organized into a plurality of virtual pages (e.g., 4 KB), and each virtual page corresponds to a smallest addressable unit of non-volatile memory 130. In some embodiments, a physical address is a physical page number (PPN), including a macro page number and/or a virtual page number. Similar to the data organization in non-volatile memory 130, WCB 230 is also organized into macro pages (e.g., WCB macro pages 322) and further divided into virtual pages (e.g., WCB virtual page 324).

In some embodiments, WBC 230 stored in volatile memory 301 contains a number of individual entries wherein the individual entries each include address information (e.g., a logical address) and write data corresponding to write commands from the host. In some embodiments, the write data is data not yet saved to non-volatile memory 130 of storage device 120. For example, as pictured in FIG. 3, WBC 230 contains individual entries 322-1, 322-2, ... 324. To decrease the processing time required for executing host commands, flushing of WBC 230 to non-volatile memory 130 occurs on an optimized basis. Optimized WBC 230 flushing, in some embodiments, is better understood with reference to FIG. 4 and FIG. 5 below.

In some embodiments, management module 121-1 (FIG. 1) coordinates the moving of information from volatile 206 to non-volatile memory 130 and maintains the FTL mapping of logical to physical addresses. In some embodiments, L1 mapping table 220 has entries storing pointers to entries in L2 mapping table 222 in volatile memory 301 (e.g., L2 DDR index 306), entries storing pointers to locations in the write-coalescing buffer (e.g., WCB macro page address 302-1 and 302-2), and entries 304 storing pointers to locations in non-volatile memory 130 that store data (e.g., PPN (NVM physical address)). In addition to the above pointers, in some embodiments, L1 mapping table 220 has entries that do not store valid pointers (e.g., unmapped 310). During a read operation, upon determining that an entry corresponding to a logical address in L1 mapping table 220 does not store a valid pointer, management module 121-1 returns a predefined null response to the host read command.

Each pointer in L1 mapping table 220 thus corresponds to a macro page-sized portion of the logical address space associated with a host system (e.g., computer system 110). The number of entries in L1 mapping table 220 corresponds to the number of macro pages in a predefined logical address space associated with a host system (e.g., computer system 110). For example, for 8 TB disk size (e.g., non-volatile memory 130 of size 8 TB with macro page size of 64 KB, the number of entries in L1 mapping table 220 is 128 K (8 TB/64 KB).

When accessing respective entries in L11 mapping table 220 based on logical addresses, such as logical block address (LBAs), the logical addresses are divided by a divisor corresponding to a size of the macro pages to generate respective indices for L1 mapping table 220, and then the entries of L1 mapping table 220 corresponding to the generated indices are read. In some embodiments, the formula to calculate the index for L1 mapping table 220 is given by equation:

$$\frac{LBA}{\text{macro page size}}$$

where LBA is a logical address specified by a read or write command, and "macro page size" is the number of LBA's per macro page (e.g., 128 LBA's per macro page, when each LBA is 512 B and each macro page is 64 KB).

In some embodiments, data pointers in L1 mapping table 220 point to macro page size chunks of data, whereas data pointers in L2 mapping table 222 point to virtual page size chunks of data. Thus, data pointers in L1 mapping table 220 enable access to macro page-sized chunks of sequentially stored data, whereas data pointers in L2 mapping table 222 enable access to virtual page-sized chunks of sequentially stored data. As shown in FIG. 3, L2 mapping table 222 has entries storing pointers to locations in WCB 230 (e.g., WCB virtual page addresses 312) and entries storing pointers to locations in non-volatile memory 130 (e.g., PPNs (virtual page physical addresses) 314). Similar to the indexing of L1 mapping table 220 above, L2 mapping table 222 is indexed by a portion of the logical address. For example, within a group of L2 mapping table entries (e.g., 16 entries) corresponding to a macro page, the entry corresponding to a particular logical address is identified by, or indexed by, a portion of the logical address.

Though not shown in FIG. 3, in some embodiments, L2 mapping table 222 has entries as back pointers that point to entries in L1 mapping table 220 for cross-referencing. In some embodiments, for each group of L2 mapping table entries corresponding to a macro page, the back pointer (not shown in FIG. 3) is stored as the first entry in the group of entries, and points to a corresponding entry in L1 mapping table 220. In some such embodiments, the address of the back pointer in the L2 mapping table is stored in the L1 mapping table 220 as a reference to the group of entries. For example, L2 DDR index 306 can store the address in L2 mapping table 222 of a back pointer, which is the first entry in a group of entries stored in L2 mapping table 222.

In L2 mapping table 222, the pointer in each entry that stores a pointer to a location in write-coalescing buffer 230 is a pointer to a location in write-coalescing buffer 230 for storing a virtual page of data. For example, entry 312-1 stores a pointer to virtual page location 324 in WCB 230. Each entry in L2 mapping table 222 for storing a pointer to a location in non-volatile memory 130 has a pointer to a location in non-volatile memory 130 for storing a virtual page of data. For example, entries 314-1 and 314-2 store pointers to locations in non-volatile memory 130 for storing virtual pages of data in NVM 250.

As explained above, mapping module 216 (FIG. 2) maintains L1 mapping table 220 and L2 mapping table 222 in volatile memory 301 as well as L1 mapping table 240 and L2 mapping table 242 in non-volatile memory 130. The entries in L1 mapping table 240 are pointers to entries in L2 mapping table 242 or pointers to locations in non-volatile memory 130 at which data is stored. For example, a subset of the entries in L1 mapping table 240 store pointers to respective macro pages in non-volatile memory 130, while other pointers in L1 mapping table 240 point to groups of entries in L2 mapping table 242. Each entry in L1 mapping table 240 corresponds to a logical address space region having a first size, e.g., equal to the size of a macro page. In some embodiments, entries in L2 mapping table 242 store pointers to locations in non-volatile memory 130 that store data 250. Each entry in L2 mapping table 242 corresponds to a logical address space region having a second size, e.g., equal to the size of a virtual page. In some embodiments, at least some of these entries in L2 mapping table 240 are also pointed by pointers stored in L1 mapping table 220. In some embodiments, mapping table entries for unmapped logical addresses store a predefined value, such as −1, indicating that the corresponding logical addresses are unmapped.

Figure 4:
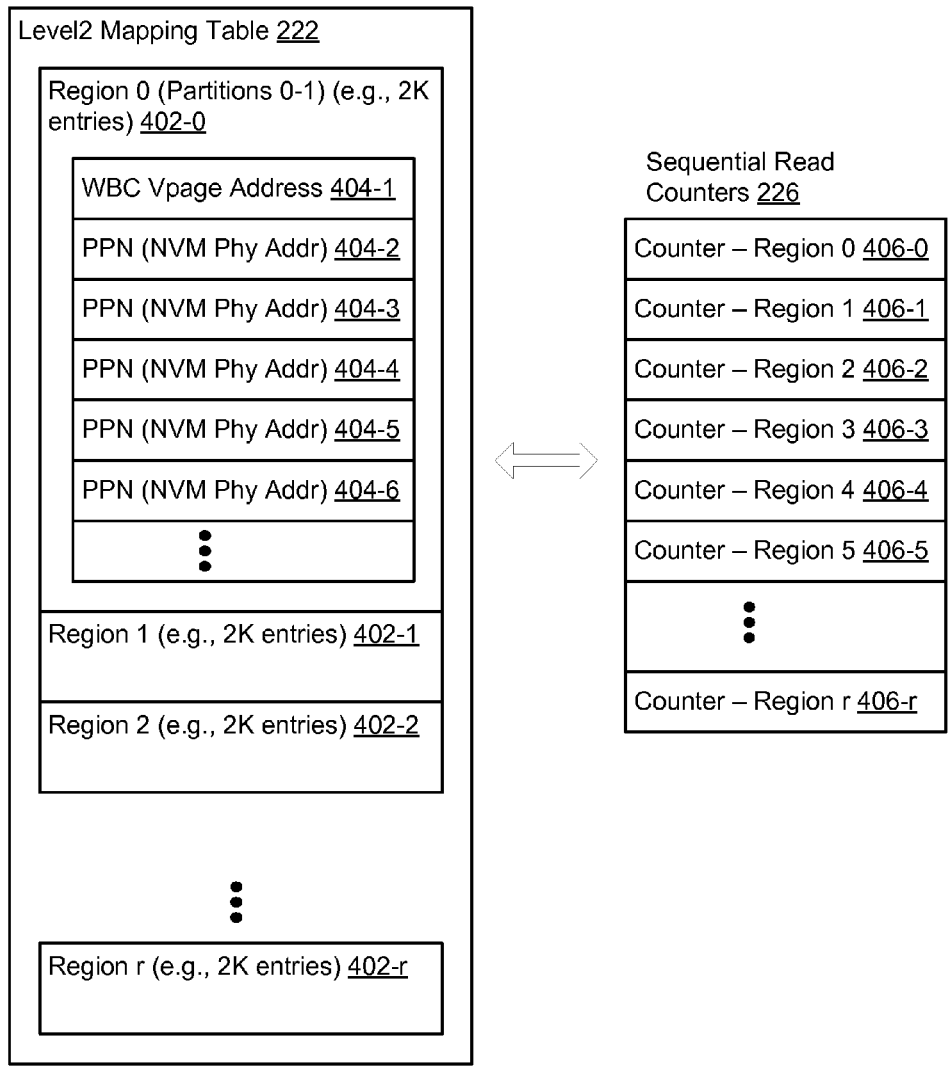
FIG. 4 is a block diagram of a mapping table and sequential read counters used in eviction process, in accordance with some embodiments.

FIG. 4 is a block diagram of L2 mapping table 222 and sequential read counters 226 used in an eviction process, in accordance with some embodiments. Both L2 mapping table 222 and sequential read counters 226 are stored in volatile memory 301. In some embodiments, L2 mapping table 222 corresponds to a subset of L2 mapping table 242 stored in non-volatile memory 130. For example, in some embodiments, L2 mapping table 222 is sized to store between 1 percent and 15 percent as many entries as L2 mapping table 242. As shown, L2 mapping table 242 is divided into regions (e.g., region 0 402-0, region 1 402-1, region 2 402-2, . . . region r 402-r). Each of the regions 402 has a set of entries 404. In some embodiments, each counter 406-i (e.g., any of counters 406-0 to 406-r) of the sequential read counters 226 is a count of sequential read operations (or alternatively, sequential I/O operations) within the set of memory locations corresponding to one region of L2 mapping able 222. In some embodiments, sequential read counters 226 are initialized to a start value, e.g., at start-of-the-day, boot time, and/or after the completion of garbage collection. An individual sequential read counter 406 is reset to a starting value when a corresponding region 402 of L2 mapping table 222 is evicted and its entries are copied to L2 mapping table 242 in non-volatile storage medium 130. The eviction process and the mapping table updates are described below in greater detail with respect to FIGS. 6A-6G.

Figure 5:
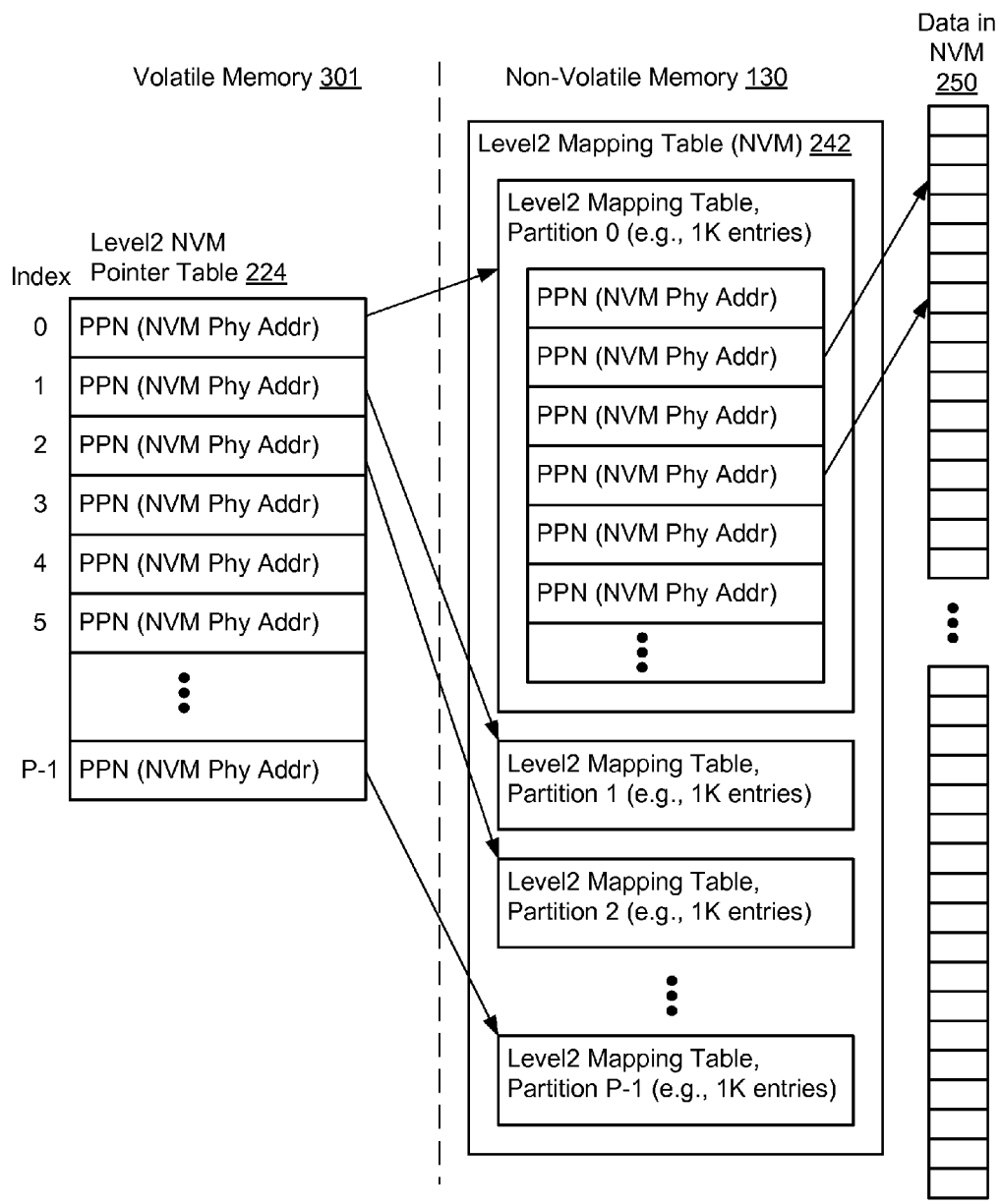
FIG. 5 is a block diagram of a mapping table in volatile memory and a corresponding mapping table in non-volatile memory, in accordance with some embodiments.
Figure 6A:
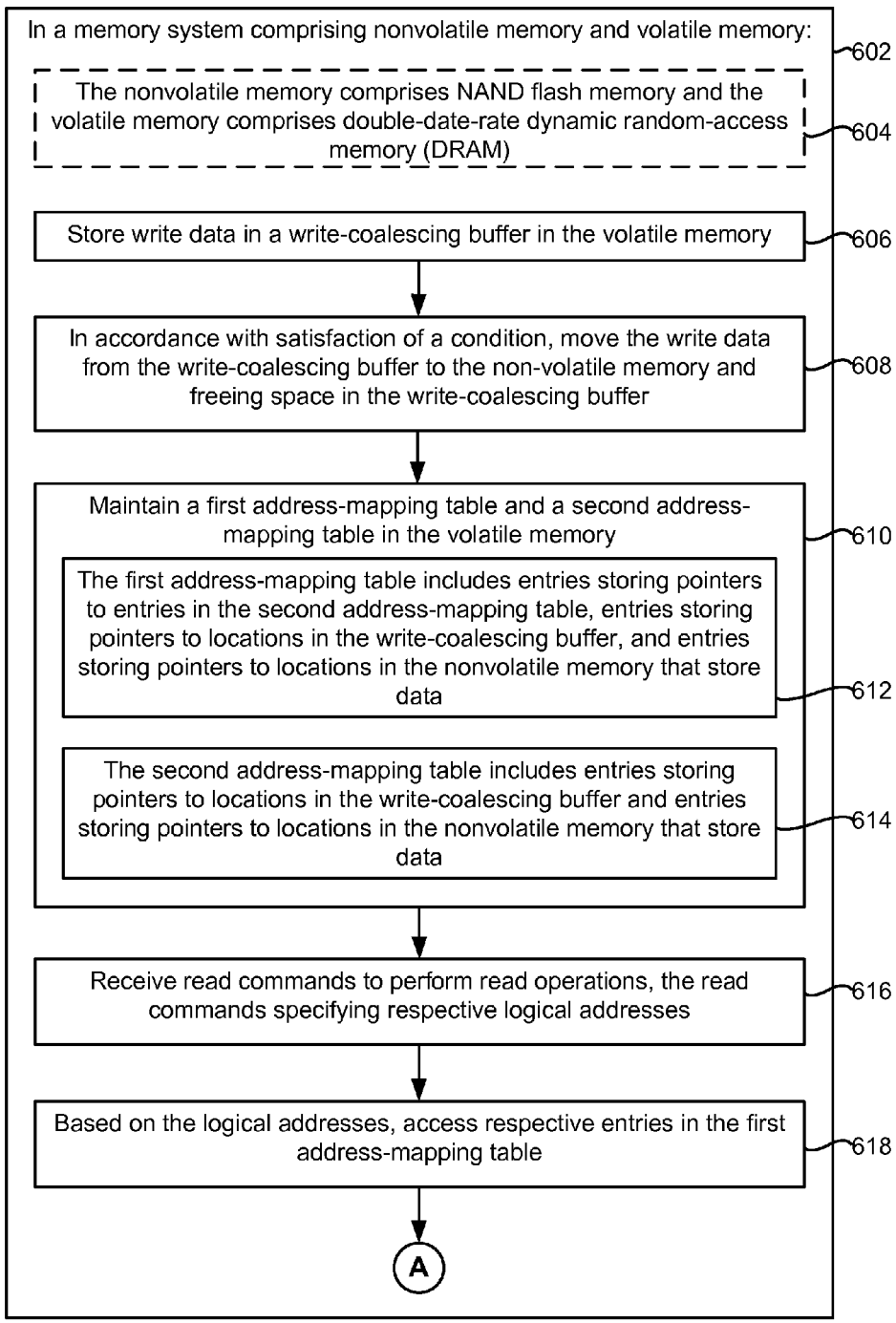
FIGS. 6A-6G are a flowchart representation of a method of managing a storage system, in accordance with some embodiments.
Figure 6B:
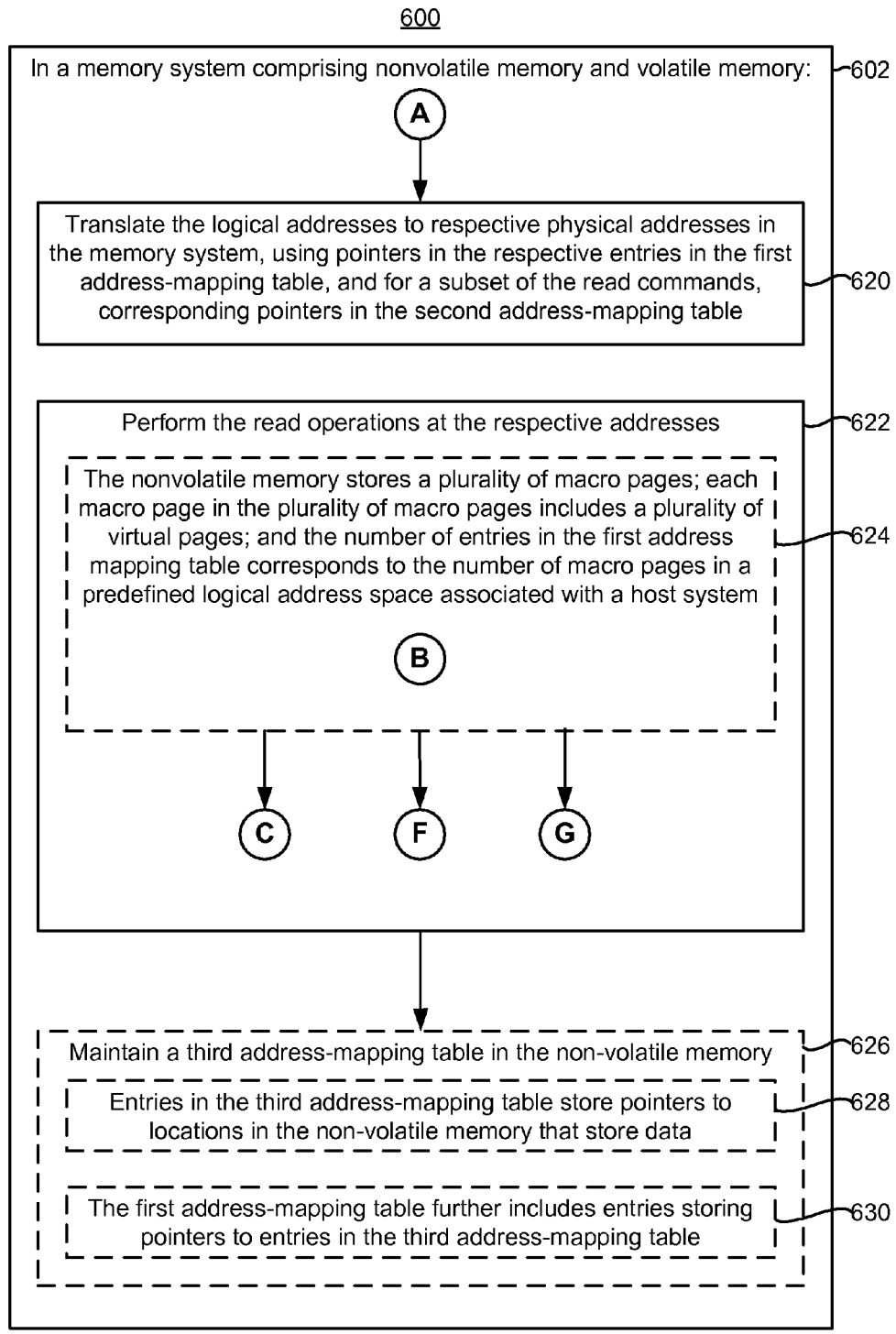
Figure 6C:
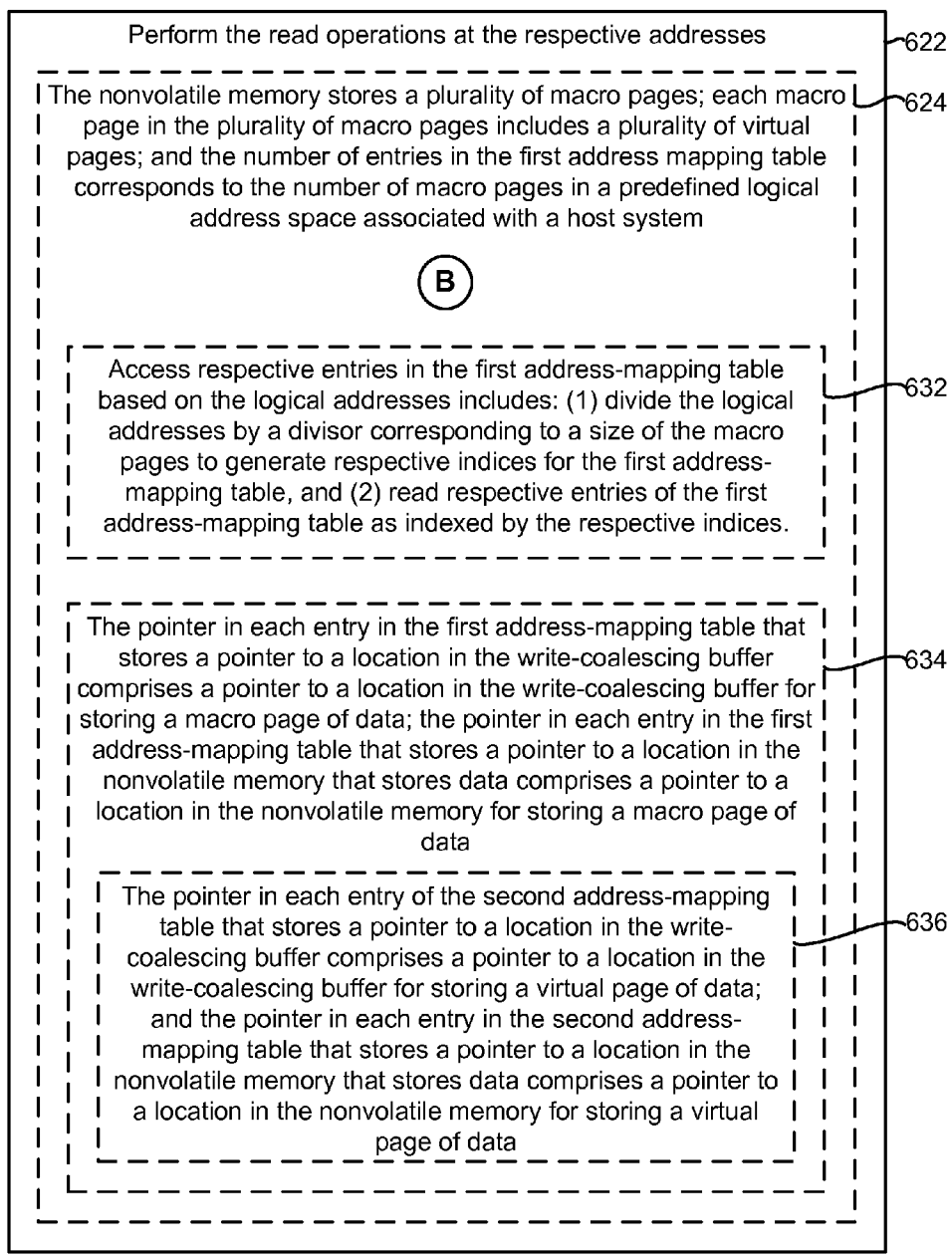
Figure 6D:
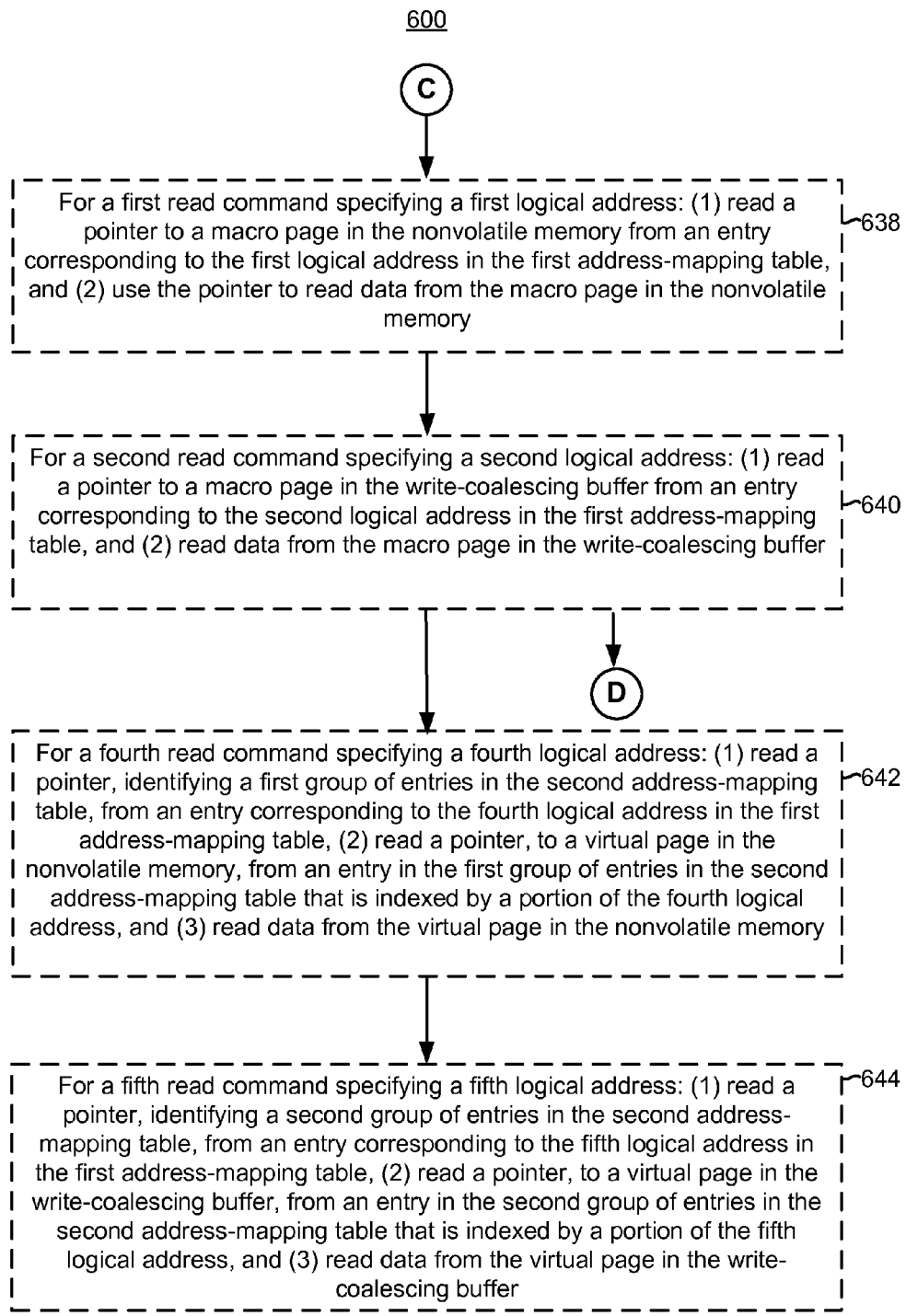
Figure 6E:
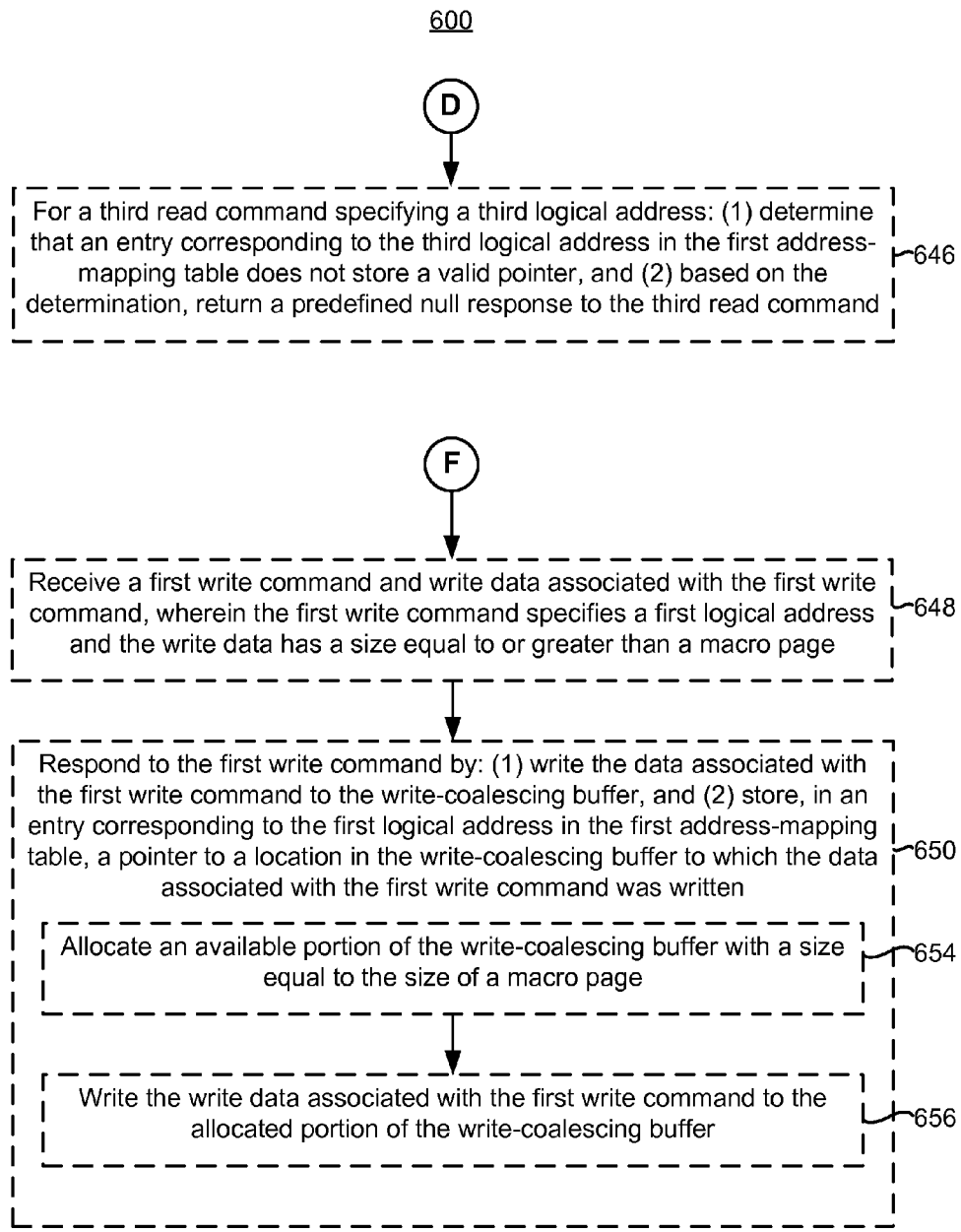
Figure 6F:
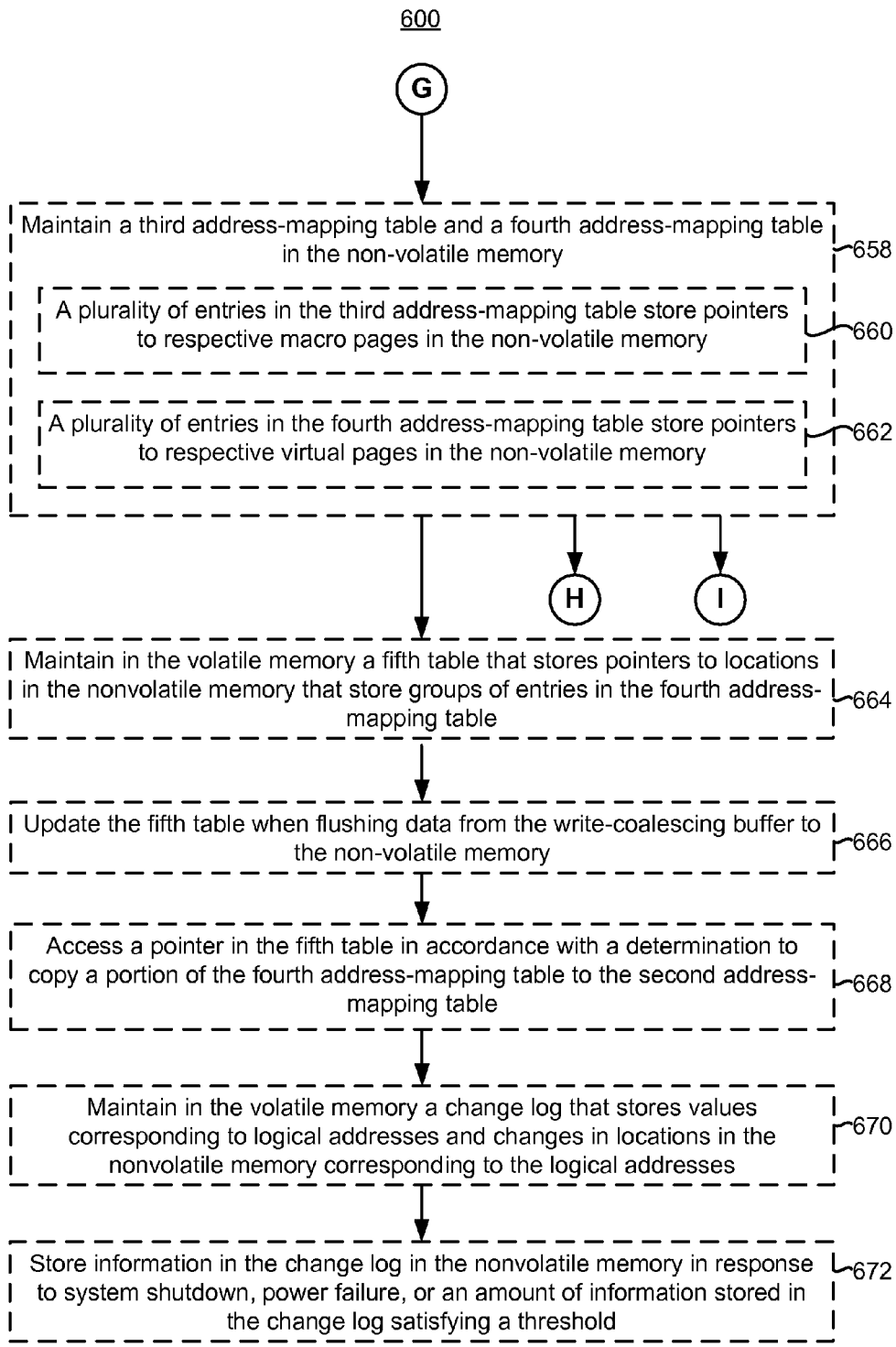
Figure 6G:
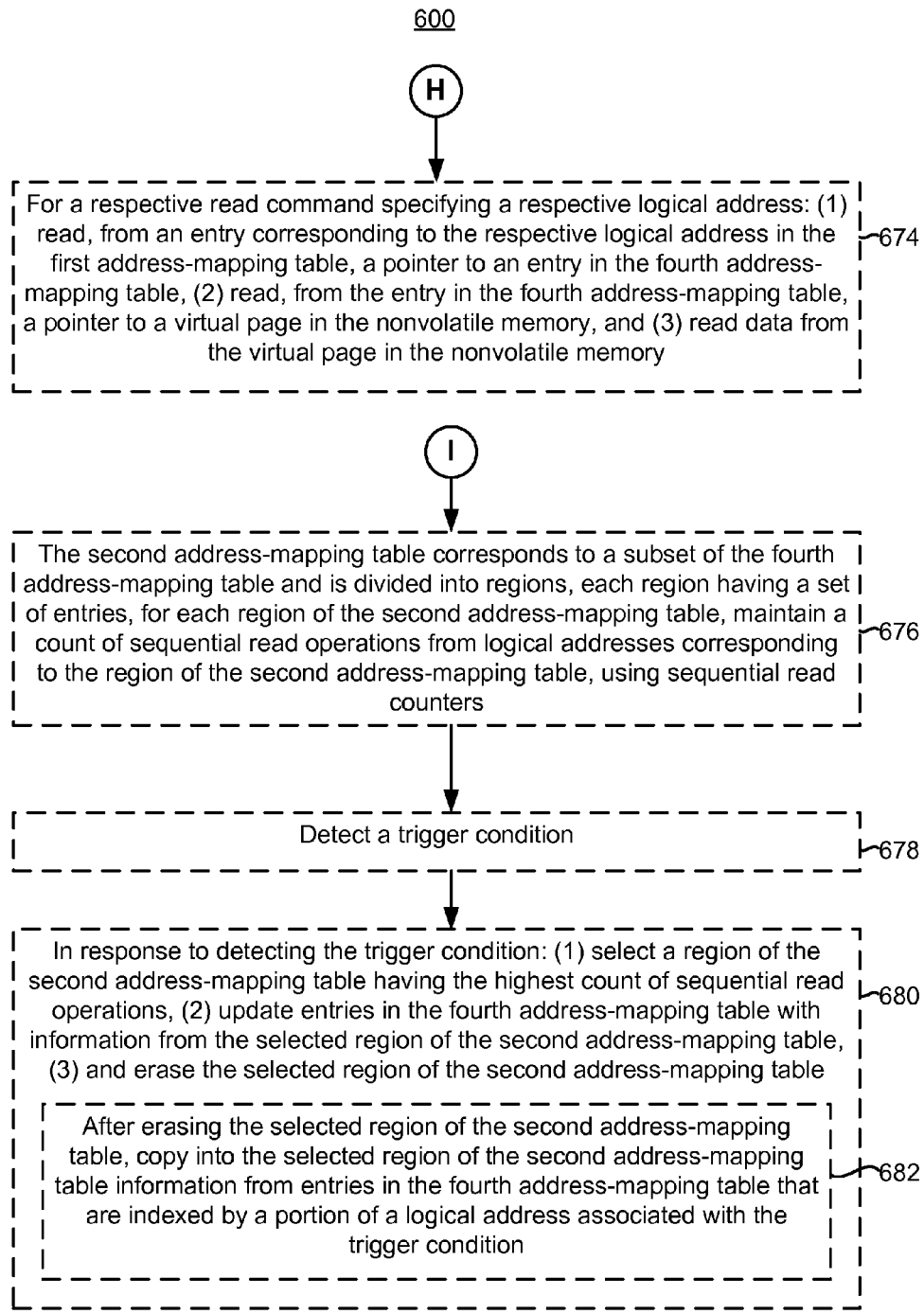

FIG. 5 is a block diagram of L2 NVM pointer table 224 in volatile memory 301 and L2 mapping table 242 in non-volatile memory 130, in accordance with some embodiments. In some embodiments, L2 NVM pointer table 224 stores pointers to locations in non-volatile memory 130 that store groups of entries in L2 mapping table 242. The entries in L2 mapping table 242 further point to data 250 stored in non-volatile memory 130. For example, in a system with 4 KB virtual page size and 4 B used for storing each PPN, each group of 1,024 entries in L2 mapping table 242 are stored in one virtual page in non-volatile memory 130. As shown in FIG. 5, each L2 mapping table partition (e.g., partition 0, partition 1, partition 2, . . . partition P-1) occupies one virtual page and accommodates 1,024 PPNs. These 1,024 PPNs further point to 1,024 virtual pages of data 250 stored in non-volatile memory 130. In some embodiments, management module 121-1 (FIG. 2) maintains in volatile memory 301 L2 NVM pointer table 224 and updates L2 NVM pointer table 224 when flushing data from the write-coalescing buffer 230 to non-volatile memory 130. L2 NVM pointer table 224 update during flushing is described in greater detail below with respect to FIGS. 6A-6G.

Though not shown in FIG. 5, in some embodiments, a change log (e.g., mapping tables update log 228, FIG. 2) is stored in volatile memory 301 and maintained by management module 121-1. The change log stores values corresponding to logical addresses and changes in locations in the non-volatile memory 130 corresponding to the logical addresses. Also not shown in FIG. 5, in some embodiments, another change log (e.g., mapping tables update log 248, FIG. 2) is stored in non-volatile memory 130 and maintained by management module 121-1. Management module 121-1 copies information from the change log (e.g., mapping tables update log 228, FIG. 2) to non-volatile memory 130 (e.g., mapping tables update log 248, FIG. 2) in response to a trigger condition. The trigger condition and the saving of information from the change log to non-volatile memory 130 (e.g., mapping tables update log 248, FIG. 2) are described in greater detail below with respect to FIGS. 6A-6G.

FIGS. 6A-6G are a flowchart representation of a method 600 of managing a storage system, in accordance with some embodiments. In some embodiments, method 600 is performed by a storage device (e.g., storage device 120, FIG. 1) of a storage system (e.g., data storage system, FIG. 1) or one or more components of the storage device (e.g., storage controller 124, FIG. 1), where the storage device is operatively coupled with a host system (e.g., computer system 110, FIG. 1). In some embodiments, the storage system is a memory system that includes non-volatile memory (e.g., storage medium 130, FIG. 1) and volatile memory (e.g., volatile memory 301, FIG. 3). In some embodiments, method 600 is governed by instructions that are stored in a non-transitory computer readable storage medium and that are executed by one or more processors of a device, such as the one or more processing units (CPUs) 122-1 of management module 121-1, shown in FIGS. 1 and 2. In some embodiments, some of the operations of method 600 are performed at a host (e.g., computer system 110, FIG. 1) and information is transmitted to a storage device (e.g., storage device 120, FIG. 1). In some embodiments, method 600 is governed, at least in part, by instructions that are stored in a non-transitory computer readable storage medium and that are executed by one or more processors of a host (not shown in FIG. 1). For the sake of brevity and simplicity, at least some of the operations of method 600 will be described with respect to storage device 120 (FIG. 1). In some embodiments, the operations of method 600 are performed, at least in part, by data read module 210, data write module 212, mapping module 216, and power fail data save module 232 of management module 121-1 (FIG. 2). However, those skilled in the art will appreciate that in other embodiments, one or more of the operations described in method 600 are performed by a host (e.g., computer system 110, FIG. 1).

In a storage system (e.g., a memory system) (602), the storage device (e.g., storage device 120, FIG. 1) that includes non-volatile memory (e.g., storage medium 130, FIG. 1) and volatile memory (e.g., volatile memory 301, FIG. 3), the non-volatile memory includes (604) NAND flash memory and the volatile memory includes double data rate (DDR) dynamic random access memory (DRAM), in accordance with some embodiments. In a write operation, management module 121-1 (FIG. 1) or a component thereof (e.g., data write module 212, FIG. 2) stores (606) write data in a write-coalescing buffer (e.g., WCB 230, FIG. 3) in the volatile memory. In accordance with satisfaction of a condition (e.g., a trigger condition, described in more detail below), management module 121-1 moves (608) the write data from the write-coalescing buffer to the non-volatile memory and frees space in the write-coalescing buffer.

In some embodiments, management module 121-1 or a component thereof (e.g., mapping module 216, FIG. 2) maintains (610) a first address-mapping table (e.g., L1 mapping table 220, FIG. 2) and a second address-mapping table (e.g., L2 mapping table 222, FIG. 2) in the volatile memory. In some embodiments, the first address-mapping table includes (612) entries storing pointers to entries in the second address-mapping table (e.g., L2 DDR index 306, FIG. 3), entries storing pointers to locations in the write-coalescing buffer (e.g., WCB macro page addresses 302, FIG. 3), and entries 304 storing pointers to locations in the non-volatile memory that store data (e.g., PPN in entry 304, FIG. 3). In some embodiments, the second address-mapping table includes (614) entries storing pointers to locations in the write-coalescing buffer (e.g., WCB virtual page addresses 312, FIG. 3) and entries storing pointers to locations in the non-volatile memory that store data (e.g., PPNs 314, FIG. 3).

Management module 121-1 or a component thereof (e.g., data read module 210, FIG. 2) receives (616) read commands to perform read operations. Typically, the read commands specify respective logical addresses. Based on the logical addresses, management module 121-1 accesses (618) respective entries in the first address-mapping table (e.g., entries in L1 mapping table 220) and translates (620) the logical addresses to respective physical addresses in the memory system. In some embodiments, the translation is performed using pointers in the respective entries in the first address-mapping table (e.g., entries in L1 mapping table 220, FIG. 3). For a subset of the read commands, the translation is performed using corresponding pointers in the second address-mapping table (e.g., corresponding pointers of L2 DDR index 306 in L2 mapping table 222, FIG. 3). Using these pointers, management module 121-1 or a component thereof (e.g., data read module 210, FIG. 2) performs the read operations at the respective physical addresses.

In addition to maintaining the first address-mapping table and the second address-mapping table, in some embodiments, management module 121-1 or a component thereof (e.g., mapping module 216) maintains (626) a third address-mapping table (e.g., L2 mapping table 242, FIG. 2) in the non-volatile memory. Entries in the third address-mapping table (e.g., L2 mapping table 242, FIG. 3) store (628) pointers to locations in the non-volatile memory that store data. The first address-mapping table (e.g., L1 mapping table 220, FIG. 3) further includes (630) entries storing pointers to entries in the third address-mapping table (e.g., L2 PPN 308, FIG. 3). It is noted that in the discussion below of operations 658-682, L2 mapping table 242 is called a fourth address-mapping table and L1 mapping table 240 is called a third address-mapping table.

As explained above with respect to FIG. 2 and FIG. 3, in the non-volatile memory (e.g., storage medium 130), a plurality of macro pages are stored (624), and each macro page in the plurality of macro pages includes a plurality of virtual pages. Also as explained above with respect to FIG. 3, in some embodiments, each entry of the first address-mapping table corresponds to a logical address having a first size, equal to the size of a macro page. In such embodiments, the number of entries in the first address-mapping table (e.g., L1 mapping table 220, FIG. 2) corresponds to the number of macro pages in a predefined logical address space associated with a host system. When accessing respective entries in the first address-mapping table (e.g., L1 mapping table 220, FIG. 2) based on the logical address, the accessing includes (632) dividing the logical addresses by a divisor corresponding to a size of the macro pages (e.g., 64 KB) to generate respective indices for the first address-mapping table (e.g., L1 mapping table 220, FIG. 2), and reading respective entries of the first address-mapping table (e.g., L1 mapping table 220, FIG. 2) as indexed by the respective indices. The calculation to generate respective indices for the first address-mapping table is described above with respect to FIG. 3.

In some embodiments, the pointer in each entry in the first address-mapping table that stores a pointer to a location in the write-coalescing buffer comprises (634) a pointer to a location in the write-coalescing buffer for storing a macro page of data, and the pointer in each entry in the first address-mapping table that stores a pointer to a location in the non-volatile memory that stores data comprises a pointer to a location in the non-volatile memory for storing a macro page of data. Similarly, in some embodiments, the pointer in each entry of the second address-mapping table that stores a pointer to a location in the write-coalescing buffer comprises (636) a pointer to a location in the write-coalescing buffer for storing a virtual page of data, and the pointer in each entry in the second address-mapping table that stores a pointer to a location in the non-volatile memory that stores data comprises a pointer to a location in the non-volatile memory for storing a virtual page of data.

For example, as shown in FIG. 3, the pointer in each entry 302 in L1 mapping table 220 that stores a pointer to a location in WCB 230 comprises a pointer to a location in WCB 230 for storing a macro page of data 322. Similarly, the pointer in each entry 312 in L2 mapping table 222 that stores a pointer to a location in WCB 230 comprises a pointer to a location in WCB 230 for storing a virtual page of data 324. In FIG. 3, the entry 304 of L1 mapping table 220 stores a pointer PPN to a location in the non-volatile memory 130 that stores data 250, and the pointer PPN points to a location in the non-volatile memory 130 for storing a macro page of data. Similarly, each entry 314 of L2 mapping table 222 stores a pointer PPN to a location in the non-volatile memory 130 that stores data 250, and the pointer PPN in these entries 314 each points to a location in the non-volatile memory 130 for storing a virtual page of data.

Using these mapping tables in the hierarchical mapping data structures 300 shown in FIG. 3, in many read operations, data can be located quickly without using mapping tables stored in the non-volatile memory. Continuing the above example, for a first read command specifying a first logical address, management module 121-1 first reads (638) a pointer to a macro page in the non-volatile memory from an entry corresponding to the first logical address in the first address-mapping table (e.g., entry 304 of L1 mapping table 220, which contains a pointer PPN to a macro page in non-volatile memory, FIG. 3). Management module 121-1 then uses the pointer (e.g., PPN in entry 304 of L1 mapping table 220, FIG. 3) to read data from the macro page in non-volatile memory without using (e.g., accessing any entries in) mapping tables stored in the non-volatile memory.

In another example, for a second read command specifying a second logical address, management module 121-1 reads (640) a pointer to a macro page in the write-coalescing buffer from an entry corresponding to the second logical address in the first address-mapping table (e.g., a WCB macro page address is read from an entry 302-1 of L1 mapping table 220, FIG. 3). Management module 121-1 then reads data from the macro page in the write-coalescing buffer (e.g., WCB macro page 322-1, FIG. 3), thus obviating the need to look up any entries in the mapping tables stored in the non-volatile memory or read data from the non-volatile memory.

In some embodiments, for a fourth read command specifying a fourth logical address, management module 121-1 reads (642) a pointer (e.g., L2 DDR index in entry 306 of L1 mapping table 220), which identifies a first group of entries in the second address-mapping table, from an entry corresponding to the fourth logical address in the first address-mapping table (e.g., L2 DDR index in entry 306 of L1 mapping table 220 points to a group of entries in L2 mapping table 222, FIG. 3). Management module 121-1 then reads a pointer (e.g., PPN in entry 314-1 of L2 mapping table 222), which points to a virtual page in the non-volatile memory, from an entry in the first group of entries in the second address-mapping table that is indexed by a portion of the fourth logical address. Using the pointer (e.g., PPN in entry 314-1, FIG. 3) management module 121-1 reads data from the virtual page in the non-volatile memory without looking up any entries in the mapping tables stored in the non-volatile memory.

In yet another example, for a fifth read command specifying a fifth logical address, management module 121-1 reads (644) a pointer (L2 DDR index in another entry (not shown in FIG. 3) of L1 mapping table 220), which identifies a second group of entries in the second address-mapping table (e.g., the aforementioned L2 DDR index in an L1 mapping table entry points to a second group of entries (not shown in FIG. 3) in L2 mapping table 222), from an entry corresponding to the fifth logical address in the first address-mapping table (e.g., an entry of L1 mapping table 220, FIG. 3). Management module 121-1 then reads a pointer (e.g., a WCB virtual page address in an entry of L2 mapping table 222, FIG. 3), which points to a virtual page in the write-coalescing buffer, from an entry in the second group of entries in the second address-mapping table that is indexed by a portion of the fifth logical address (e.g., the aforementioned entry of L2 mapping table 222, FIG. 3). Using the pointer (e.g., a WCB virtual page address), similar to the operation 640 described above, management module 121-1 reads data from the virtual page in the write-coalescing buffer, thus obviating the need to look up any entries in the mapping tables stored in the non-volatile memory or read data from the non-volatile memory.

In some embodiments, for a third read command specifying a third logical address, management module 121-1 determines (646) that an entry corresponding to the third logical address in the first address-mapping table does not store a valid pointer (e.g., unmapped entry 310, FIG. 3). Based on the determination, management module 121-1 returns a predefined null response to the third read command (e.g., −1).

In the read operations described above, entries in the mapping tables in volatile memory 301 are updated in response to some read operations, in accordance with some embodiments. For example, when a read operation requires access to one or more entries in L2 mapping table 242 in non-volatile memory, a corresponding set of entries in L2 mapping table 242 are copied into L2 mapping table 222 in volatile memory 301, and a corresponding entry in L1 mapping table 220 is updated to point to that set of entries in L2 mapping table 222. As a result, subsequent read operations in the same region of memory use L2 mapping table entries in volatile memory, which is much faster than accessing entries in L2 mapping table 242 in non-volatile memory.

In a write operation, in some embodiments or in some circumstances, management module 121-1 receives (648) a first write command and write data associated with the first write command, the first write command specifies a first logical address, and the write data has a size equal to or greater than a macro page. Management module 121-1 responds (650) to the first write command by writing the data associated with the first write command to the write-coalescing buffer, and storing, in an entry corresponding to the first logical address in the first address-mapping table, a pointer to a location in the write-coalescing buffer to which the data associated with the first write command was written (e.g., WCB macro page addresses 302, FIG. 3).

In some embodiments, management module 121-1, while responding to the first write command allocates (654) an available portion of the write-coalescing buffer with a size equal to the size of a macro page, and then writes (656) the write data associated with the first write command to the allocated portion of the write-coalescing buffer. It is noted that a write operation such as the one corresponding to the aforementioned first write command may replace data previously stored in the memory system, and therefore, in such circumstances, the previously stored data is invalidated by memory system. More specifically, in some circumstances or in some embodiments, management module 121-1, while responding to the first write command and prior to storing, in the entry corresponding to the first logical address in the first address-mapping table, a pointer to the location in the write-coalescing buffer to which the write data is written, determines whether that entry stores a pointer to a group of entries in either the second address-mapping table in volatile memory or the second address-mapping table in non-volatile memory, and if so, the management module 121-1 invalidates those entries of the second address-mapping table and also invalidates any data pointed to by those entries of the second address-mapping table.

As explained above with respect to FIG. 2 and FIG. 3, in addition to maintaining the address mapping tables stored in volatile memory, management module 121-1 also maintains address mapping tables stored in the non-volatile memory. In some embodiments, management module 121-1 maintains (658) a third address-mapping table (e.g., L1 mapping table 240, FIG. 3) and a fourth address-mapping table (e.g., L2 mapping table 242, FIG. 3) in the non-volatile memory (e.g., non-volatile memory 130, FIG. 3). A plurality of entries in the third address-mapping table store (660) pointers to respective macro pages in the non-volatile memory, and a plurality of entries in the fourth address-mapping table store (662) pointers to respective virtual pages in the non-volatile memory as shown in FIG. 5.

In some embodiments, the second mapping table (e.g., L2 mapping table 222 stored in volatile memory 301, FIG. 3) corresponds to a subset of the fourth mapping table (e.g., L2 mapping table 242 stored in non-volatile memory 130, FIG. 3). In some embodiments, management module 121-1 maintains (664) in the volatile memory a fifth table (e.g., L2 NVM pointer table 224, FIG. 3 and FIG. 5) that stores pointers to locations in the non-volatile memory that store groups of entries in the fourth address-mapping table (e.g., entries in L2 NVM pointer table 224 point to locations in L2 mapping table 242, FIG. 5). In some embodiments, the fifth table (e.g., L2 NVM pointer table 224, FIG. 5) is updated (666) when flushing data from the write-coalescing buffer to non-volatile memory.

In some embodiments, flushing data from the write-coalescing buffer to the non-volatile memory is accomplished by copying the data from the write-coalescing buffer to the non-volatile memory, erasing the portion(s) of the write-coalescing buffer from which data was flushed, and updating corresponding entries in mapping tables stored in the volatile memory (e.g., L1 mapping table 220 and L2 mapping table 222 stored in volatile memory 301). Optionally, the flushing process further includes selecting a region of the second address-mapping table (e.g., L2 mapping table 222, FIG. 3 and FIG. 4) to flush to the non-volatile memory according to sequential read counters (e.g., sequential read counter 226, FIG. 2 and FIG. 4) for the regions of the second address-mapping table. In conjunction with selecting the region of the second address-mapping table (e.g., L2 mapping table 222, FIG. 3) to flush, management module 121-1 updates the fourth address-mapping table (e.g., L2 mapping table 242, FIG. 3) with the entries in the selected region of the second address-mapping table (e.g., L2 mapping table 222, FIG. 3), erases the portion(s) of the write-coalescing buffer from which data was flushed, and erases the selected region of the second address-mapping table (e.g., L2 mapping table 222, FIG. 3). In addition, in some embodiments, management module 121-1 updates each entry in the fifth table (e.g., L2 NVM pointer table 224, FIG. 5) corresponding to a portion of the fourth address-mapping table (e.g., L2 mapping table 242, FIG. 5) that is updated during the flushing process. Further, in accordance with a determination to copy a portion of the fourth address-mapping table (e.g., L2 mapping table 242, FIG. 5) to the second address-mapping table (e.g., L2 mapping table 222, FIG. 5), management module 121-1 accesses (668) a pointer in the fifth table (e.g., L2 NVM pointer table 224, FIG. 5).

As described above with respect to FIG. 5, in some embodiments, a change log (e.g., mapping tables update log 228, FIG. 2) is stored in the volatile memory and maintained (670) by management module 121-1. The change log stores values corresponding to logical addresses and locations (e.g., newly assigned or changed locations) in the non-volatile memory 130 corresponding to the logical addresses. Also as described above with respect to FIG. 5, in some embodiments, another change log (e.g., mapping tables update log 248, FIG. 2) is stored in non-volatile memory 130 and maintained by management module 121-1. Management module 121-1 copies information from the change log in volatile memory 301 (e.g., mapping tables update log 228, FIG. 2) to non-volatile memory 130 (e.g., mapping tables update log 248, FIG. 2) in response to a trigger condition and stores (672) the copied information to non-volatile memory. For example, in some embodiments, mapping tables update log 228 is implemented as a circular buffer having a size of two or four virtual pages, while mapping tables update log 248 is a sequential data structure that grows in size as data from mapping tables update log 228 is copied to mapping tables update log 248. Continuing with this example, each time a full page (e.g., 4 KB) of log information has been stored in the change log stored in volatile memory 301, that page is copied to non-volatile memory 130, while new information continues to be added to another page (e.g., 4 KB) of the change log stored in volatile memory 301. In some embodiments, system shutdown and/or power failure are trigger conditions that cause management module 121-1 to copy information from the change log in volatile memory 301 to the change log in non-volatile memory 130.

Typically, reading from the address mapping tables stored in the non-volatile memory is sometimes necessary to locate the data requested by a read command, because the address mapping tables stored in volatile memory contain only a subset of the address mapping information for the memory system. For a respective read command specifying a respective logical address, management module 121-1 reads (674), from an entry corresponding to the respective logical address in the first address-mapping table (e.g., entry 308 of L1 mapping table 220, FIG. 3), a pointer (e.g., L2 PPN) to an entry in the fourth address-mapping table, reads, from the entry in the fourth address-mapping table (e.g., L2 mapping table 242, FIG. 3), a pointer to a virtual page in the non-volatile memory, and reads data from the virtual page in the non-volatile memory. Thus, for such read commands, obtaining the requested data requires a read from the fourth address-mapping table in non-volatile memory before reading the requested data from non-volatile memory.

To facilitate the determination of what portions of the write coalescing buffer 230 to flush to non-volatile memory when space is needed in the write coalescing buffer, sequential read counters 226 are maintained by management module 121-1. It is noted that in various embodiments, any of a variety of trigger conditions may be used for determining that space is needed in the write coalescing buffer. For example, in some embodiments, the trigger condition is detected when the write coalescing buffer has less than a predefined amount of unused space (e.g., at least N1 macro pages and/or at least N2 virtual pages, where N1 and/or N2 are appropriately selected positive integer values). In another example, the trigger condition is detected when a write command is received that includes more write data than can be stored in currently unused space in the write coalescing buffer.

As described above with respect to FIG. 3 and FIG. 4, the second address-mapping table (e.g., L2 mapping table 222, FIG. 3) typically corresponds (676) to a subset of the fourth address-mapping table (e.g., L2 mapping table 242, FIG. 3). In some embodiments, the second address-mapping table (e.g., L2 mapping table 222, FIG. 3) is divided into regions, with each region having a set of entries. For each region of the second address-mapping table (e.g., L2 mapping table 222, FIG. 3), management module 121-1 maintains a count of sequential read operations from logical addresses corresponding to the region of the second address-mapping table, using sequential read counters (e.g., sequential read counters 226, FIG. 2 and FIG. 4). The sequential read counters are then used to determine which portion(s) of the write-coalescing buffer to evict to make room in the write-coalescing buffer for storing new write data.

For example, in FIG. 4, counter 406-0, counter 406-1, and counter 406-r may store count values of 100, 50000, and 6000 respectively. A count value of 100 in counter 0 406-0 indicates that region 0 402-0 had 100 sequential read operations. In comparison, a count value of 50000 in counter 1 406-1 indicates that region 1 402-1 had more sequential read operations than region 0 402-0 and region r 402-r. Continuing with this example, in accordance with a determination that 50000 is the highest count of sequential read operations, management module 121-1 evicts region 1 402-1 from L2 mapping table 242 by selecting region 1 402-1 in accordance with the sequential read counters, flushing corresponding portions of the write-coalescing buffer (e.g., portions of WCB 230 pointed to by pointers in region 402-1 of L2 mapping table 222) to non-volatile memory 130, updating corresponding entries in L2 mapping table 222 to point to the non-volatile memory locations of the flushed data, flushing the selected region 1 402-1 of L2 mapping table 222 to L2 mapping table 242 in non-volatile memory, and erasing region 1 402-1 in L2 mapping table 222.

In some embodiments, management module 121-1 detects (678) a trigger condition (e.g., the write-coalescing buffer is full, or has less than a predefined amount of unused space, or has insufficient unused space to store newly received write data). In response to detecting the trigger condition, management module 121-1 selects (680) a region of the second address-mapping table that has the highest count of sequential read operations. Entries in the fourth address-mapping table (e.g., L2 mapping table 242, FIG. 3) are updated with information from the selected region of the second address-mapping table (e.g., L2 mapping table 222, FIG. 3) and the selected region of the second address-mapping table (e.g., L2 mapping table 222) is erased. In some embodiments, the entries from the fourth address-mapping table (e.g., L2 mapping table 242, FIG. 4) that are overwritten with the corresponding set of entries from the second address-mapping table (e.g., L2 mapping table 222, FIG. 3) are indexed by a portion of a logical address associated with the trigger condition.

In some embodiments, since only a portion of the fourth address-mapping table (e.g., L2 mapping table 242, FIG. 3) is stored in the second address-mapping table in volatile memory, the second address-mapping table (e.g., L2 mapping table 222, FIG. 3) may not already include one or more entries corresponding to the logical address(es) specified by a write command. In such embodiments, and in some circumstances, while processing the aforementioned write command, management module 121-1 copies (682) entries from the fourth address-mapping table (e.g., entries corresponding the logical address(es) specified by the write command) into the selected region of the second address-mapping table (e.g., L2 mapping table 222, FIG. 3). For example, if the write command is a command to write data to a specified virtual page for which there is no corresponding entry in L2 mapping table 222, processing the write command includes copying a set of L2 mapping table entries (e.g., sixteen entries) corresponding to the logical address of the specified virtual page from L2 mapping table 242 into L2 mapping table 222 in volatile memory.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The semiconductor memory elements located within and/or over a substrate may be arranged in two or three dimensions, such as a two dimensional memory structure or a three dimensional memory structure.

The term "three-dimensional memory device" (or 3D memory device) is herein defined to mean a memory device having multiple memory layers or multiple levels (e.g., sometimes called multiple memory device levels) of memory elements, including any of the following: a memory device having a monolithic or non-monolithic 3D memory array; or two or more 2D and/or 3D memory devices, packaged together to form a stacked-chip memory device.

One of skill in the art will recognize that this invention is not limited to the two dimensional and three dimensional structures described but cover all relevant memory structures within the spirit and scope of the invention as described herein and as understood by one of skill in the art.

It will be understood that, although the terms "first," "second," etc. may be used herein to describe various elements, these elements should not be limited by these terms. These terms are only used to distinguish one element from another. For example, a first storage device could be termed a second storage device, and, similarly, a second storage device could be termed a first storage device, without changing the meaning of the description, so long as all occurrences of the "first storage device" are renamed consistently and all occurrences of the "second storage device" are renamed consistently. The first storage device and the second storage device are both storage devices, but they are not the same storage device.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of performing address mapping, the method comprising:
   in a memory system comprising non-volatile memory and volatile memory:
      storing write data in a write-coalescing buffer in the volatile memory;
      in accordance with satisfaction of a condition, moving the write data from the write-coalescing buffer to the non-volatile memory and freeing space in the write-coalescing buffer; and
      maintaining a first address-mapping table and a second address-mapping table in the volatile memory, wherein:
         the first address-mapping table includes entries storing pointers to entries in the second address-mapping table, entries storing pointers to locations in the write-coalescing buffer, and entries storing pointers to locations in the non-volatile memory that store data; and the second address-mapping table includes entries storing pointers to locations in the write-coalescing buffer and entries storing pointers to locations in the non-volatile memory that store data.

2. The method of claim 1, further comprising:
receiving read commands to perform read operations, the read commands specifying respective logical addresses;
based on the logical addresses, accessing respective entries in the first address-mapping table;
translating the logical addresses to respective physical addresses in the memory system, using pointers in the respective entries in the first address-mapping table, and for a subset of the read commands, corresponding pointers in the second address-mapping table; and
performing the read operations at the respective addresses.

3. The method of claim 2, further comprising maintaining a third address-mapping table in the non-volatile memory, wherein:
entries in the third address-mapping table store pointers to locations in the non-volatile memory that store data; and
the first address-mapping table further includes entries storing pointers to entries in the third address-mapping table.

4. The method of claim 2, wherein:
the non-volatile memory stores a plurality of macro pages;
each macro page in the plurality of macro pages includes a plurality of virtual pages; and
the number of entries in the first address mapping table corresponds to the number of macro pages in a predefined logical address space associated with a host system.

5. The method of claim 4, wherein accessing respective entries in the first address-mapping table based on the logical addresses comprises:
dividing the logical addresses by a divisor corresponding to a size of the macro pages to generate respective indices for the first address-mapping table; and
reading respective entries of the first address-mapping table as indexed by the respective indices.

6. The method of claim 4, wherein:
the pointer in each entry in the first address-mapping table that stores a pointer to a location in the write-coalescing buffer comprises a pointer to a location in the write-coalescing buffer for storing a macro page of data; and
the pointer in each entry in the first address-mapping table that stores a pointer to a location in the non-volatile memory that stores data comprises a pointer to a location in the non-volatile memory for storing a macro page of data.

7. The method of claim 6, wherein:
the pointer in each entry of the second address-mapping table that stores a pointer to a location in the write-coalescing buffer comprises a pointer to a location in the write-coalescing buffer for storing a virtual page of data; and
the pointer in each entry in the second address-mapping table that stores a pointer to a location in the non-volatile memory that stores data comprises a pointer to a location in the non-volatile memory for storing a virtual page of data.

8. The method of claim 4, comprising:
for a first read command specifying a first logical address:
reading a pointer to a macro page in the non-volatile memory from an entry corresponding to the first logical address in the first address-mapping table; and
using the pointer to read data from the macro page in the non-volatile memory; and
for a second read command specifying a second logical address:
reading a pointer to a macro page in the write-coalescing buffer from an entry corresponding to the second logical address in the first address-mapping table; and
reading data from the macro page in the write-coalescing buffer.

9. The method of claim 8, comprising, for a third read command specifying a third logical address:
determining that an entry corresponding to the third logical address in the first address-mapping table does not store a valid pointer; and
based on the determining, returning a predefined null response to the third read command.

10. The method of claim 8, further comprising:
for a fourth read command specifying a fourth logical address:
reading a pointer, identifying a first group of entries in the second address-mapping table, from an entry corresponding to the fourth logical address in the first address-mapping table;
reading a pointer, to a virtual page in the non-volatile memory, from an entry in the first group of entries in the second address-mapping table that is indexed by a portion of the fourth logical address; and
reading data from the virtual page in the non-volatile memory; and
for a fifth read command specifying a fifth logical address:
reading a pointer, identifying a second group of entries in the second address-mapping table, from an entry corresponding to the fifth logical address in the first address-mapping table;
reading a pointer, to a virtual page in the write-coalescing buffer, from an entry in the second group of entries in the second address-mapping table that is indexed by a portion of the fifth logical address; and
reading data from the virtual page in the write-coalescing buffer.

11. The method of claim 4, further comprising:
receiving a first write command and write data associated with the first write command, wherein the first write command specifies a first logical address and the write data has a size equal to or greater than a macro page; and
responding to the first write command by:
writing the data associated with the first write command to the write-coalescing buffer; and
storing, in an entry corresponding to the first logical address in the first address-mapping table, a pointer to a location in the write-coalescing buffer to which the data associated with the first write command was written.

12. The method of claim 11, wherein responding to the first write command includes:

allocating an available portion of the write-coalescing buffer with a size equal to the size of a macro page; and writing the write data associated with the first write command to the allocated portion of the write-coalescing buffer.

13. The method of claim 4, further comprising maintaining a third address-mapping table and a fourth address-mapping table in the non-volatile memory, wherein:
   a plurality of entries in the third address-mapping table store pointers to respective macro pages in the non-volatile memory; and
   a plurality of entries in the fourth address-mapping table store pointers to respective virtual pages in the non-volatile memory.

14. The method of claim 13, further comprising:
   maintaining in the volatile memory a fifth table that stores pointers to locations in the non-volatile memory that store groups of entries in the fourth address-mapping table;
   updating the fifth table when flushing data from the write-coalescing buffer to the non-volatile memory; and
   accessing a pointer in the fifth table in accordance with a determination to copy a portion of the fourth address-mapping table to the second address-mapping table.

15. The method of claim 14, further comprising:
   maintaining in the volatile memory a change log that stores values corresponding to logical addresses and changes in locations in the non-volatile memory corresponding to the logical addresses; and
   storing information in the change log in the non-volatile memory in response to system shutdown, power failure, or an amount of information stored in the change log satisfying a threshold.

16. The method of claim 13, comprising, for a respective read command specifying a respective logical address:
   reading, from an entry corresponding to the respective logical address in the first address-mapping table, a pointer to an entry in the fourth address-mapping table;
   reading, from the entry in the fourth address-mapping table, a pointer to a virtual page in the non-volatile memory; and
   reading data from the virtual page in the non-volatile memory.

17. The method of claim 13, wherein the second address-mapping table corresponds to a subset of the fourth address-mapping table and is divided into regions, each region having a set of entries, the method further comprising:
   for each region of the second address-mapping table, maintaining a count of sequential read operations from logical addresses corresponding to the region of the second address-mapping table, using sequential read counters;
   detecting a trigger condition; and
   in response to detecting the trigger condition:
      selecting a region of the second address-mapping table having the highest count of sequential read operations,
      updating entries in the fourth address-mapping table with information from the selected region of the second address-mapping table, and
      erasing the selected region of the second address-mapping table.

18. The method of claim 17, further comprising, after erasing the selected region of the second address-mapping table, copying into the selected region of the second address-mapping table information from entries in the fourth address-mapping table that are indexed by a portion of a logical address associated with the trigger condition.

19. The method of claim 1, wherein the non-volatile memory comprises NAND flash memory and the volatile memory comprises dynamic random-access memory (DRAM).

20. A storage device, comprising:
   non-volatile memory;
   controller memory, including volatile memory; and
   a storage controller having one or more processors configured to execute one or more programs stored in the controller memory, wherein the one or more programs, when executed by the one or more processors, cause the storage device to perform operations comprising:
      storing write data in a write-coalescing buffer in the volatile memory;
      in accordance with satisfaction of a condition, moving the write data from the write-coalescing buffer to the non-volatile memory and freeing space in the write-coalescing buffer; and
      maintaining a first address-mapping table and a second address-mapping table in the volatile memory, wherein:
         the first address-mapping table includes entries storing pointers to entries in the second address-mapping table, entries storing pointers to locations in the write-coalescing buffer, and entries storing pointers to locations in the non-volatile memory that store data; and
         the second address-mapping table includes entries storing pointers to locations in the write-coalescing buffer and entries storing pointers to locations in the non-volatile memory that store data.

21. The storage device of claim 20, wherein the one or more programs further include instructions that, when executed by the one or more processors, cause the storage device to perform operations comprising:
   receiving read commands to perform read operations, the read commands specifying respective logical addresses;
   based on the logical addresses, accessing respective entries in the first address-mapping table;
   translating the logical addresses to respective physical addresses in the memory system, using pointers in the respective entries in the first address-mapping table, and for a subset of the read commands, corresponding pointers in the second address-mapping table; and
   performing the read operations at the respective addresses.

22. The storage device of claim 21, wherein the storage controller includes a mapping module to perform address mapping operations using the first address-mapping table and the second address-mapping table, and a data read module to perform the read operations.

23. A non-transitory computer readable storage medium, storing one or more programs configured for execution by one or more processors of a storage controller of a storage device having non-volatile memory and controller memory, including volatile memory, the storage controller having one or more processors configured to execute the one or more programs, wherein the one or more programs, when executed by the one or more processors of the storage controller cause the storage device to perform operations comprising:
   storing write data in a write-coalescing buffer in the volatile memory;

in accordance with satisfaction of a condition, moving the write data from the write-coalescing buffer to the non-volatile memory and freeing space in the write-coalescing buffer; and maintaining a first address-mapping table and a second address-mapping table in the volatile memory, wherein:
  the first address-mapping table includes entries storing pointers to entries in the second address-mapping table, entries storing pointers to locations in the write-coalescing buffer, and entries storing pointers to locations in the non-volatile memory that store data; and the second address-mapping table includes entries storing pointers to locations in the write-coalescing buffer and entries storing pointers to locations in the non-volatile memory that store data.

\* \* \* \* \*